United States Patent
Altschule

(10) Patent No.: US 10,725,205 B2
(45) Date of Patent: Jul. 28, 2020

(54) FORENSIC WEATHER SYSTEM

(71) Applicant: Forensic Weather Consultants, LLC, Albany, NY (US)

(72) Inventor: Howard Gregory Altschule, Slingerlands, NY (US)

(73) Assignee: FORENSIC WEATHER CONSULTANTS, LLC, Albany, NY (US)

(*) Notice: Subject to any disclaimer, the term of this patent is extended or adjusted under 35 U.S.C. 154(b) by 0 days.

(21) Appl. No.: 16/120,941

(22) Filed: Sep. 4, 2018

(65) Prior Publication Data
US 2019/0004210 A1    Jan. 3, 2019

Related U.S. Application Data

(63) Continuation-in-part of application No. 15/876,413, filed on Jan. 22, 2018, which is a continuation-in-part of application No. 15/141,109, filed on Apr. 28, 2016, now Pat. No. 10,345,485.

(60) Provisional application No. 62/302,921, filed on Mar. 3, 2016, provisional application No. 62/238,606, filed on Oct. 7, 2015.

(51) Int. Cl.
| | |
|---|---|
| G01W 1/10 | (2006.01) |
| G06N 7/00 | (2006.01) |
| G01W 1/06 | (2006.01) |
| G01W 1/14 | (2006.01) |
| G01S 13/95 | (2006.01) |
| G01W 1/02 | (2006.01) |

(Continued)

(52) U.S. Cl.
CPC ............. *G01W 1/10* (2013.01); *G01S 13/958* (2013.01); *G01W 1/02* (2013.01); *G01W 1/06* (2013.01); *G01W 1/14* (2013.01); *G06N 7/00* (2013.01); *G01S 13/95* (2013.01); *G01W 2001/006* (2013.01); *G01W 2203/00* (2013.01); *G06N 20/00* (2019.01)

(58) Field of Classification Search
CPC . G01P 5/02; G01W 1/10; G01W 1/14; G01W 2203/00; G01W 1/00; G01W 1/02; G01W 2201/00; G05B 13/048; H02K 7/183; G06F 17/3087; G06F 17/30333; G06F 17/30241; H04L 41/0645
See application file for complete search history.

(56) References Cited

U.S. PATENT DOCUMENTS

| | | |
|---|---|---|
| 9,411,072 B1 | 8/2016 | Dixon |
| 2002/0091752 A1 | 7/2002 | Firlie |

(Continued)

OTHER PUBLICATIONS

Shahed Ahmed, USPTO Notice of Allowance and Fees Due, U.S. Appl. No. 15/141,109, dated Feb. 25, 2019, 13 pages.

(Continued)

*Primary Examiner* — Shahed Ahmed
(74) *Attorney, Agent, or Firm* — Maxine L. Barasch; Keohane & D'Alessandro, PLLC

(57) ABSTRACT

A forensic weather analyzer compares actual meteorological readings with data from multiple weather models. The data is compared and a forensic weather model is selected as the weather model that most closely matches the meteorological readings. The forensic weather model is then used to provide meteorological information pertaining to a weather event such as a hurricane, at a specific location such as a street address.

20 Claims, 23 Drawing Sheets

(51) Int. Cl.
*G01W 1/00* (2006.01)
*G06N 20/00* (2019.01)

(56) References Cited

U.S. PATENT DOCUMENTS

| | | | |
|---|---|---|---|
| 2007/0050142 A1 | 3/2007 | Posey et al. | |
| 2010/0185499 A1* | 7/2010 | Dwarakanath | G06Q 10/04 705/7.31 |
| 2013/0117608 A1 | 5/2013 | Kirby | |
| 2014/0324351 A1* | 10/2014 | Dannevik | G01W 1/10 702/3 |
| 2015/0161150 A1* | 6/2015 | Goering | G06F 16/29 707/743 |
| 2017/0039307 A1 | 2/2017 | Koger et al. | |
| 2017/0329048 A1* | 11/2017 | Lemos | G01W 1/10 |
| 2018/0062393 A1 | 3/2018 | Bou-Zeid et al. | |

OTHER PUBLICATIONS

Ahmed, Shahed, U.S. Appl. No. 15/141,109, Office Action dated Jun. 28, 2018, 13 pgs.

Altschule, Howard, "Wind v. Water Damage: Forensic Meteorology's Role in Post-Sandy Claims", https://www.propertycasualty360.com/2012/11/02/wind-v-water-damage-forensic-meteorologys-role-in/, Nov. 2, 2012, 6 pgs.

"Adcirc User's Manual V50 Introduction", https://adcirc.org/home/documentation/users-manual-v50/introduction/, Apr. 10, 2012, 1 pg.

"ADvanced CIRCulation Model", US Army Corps of Engineers, https://www.erdc.usace.army.mil/DesktopModules/ArticleCS/Print.aspx?PortalId=55&Mod, Nov. 21, 2012, 4 pgs.

"Adcirc User's Manual V50", https://adcirc.org/home/documentation/users-manual-v50/, Apr. 10, 2012, 1 pg.

Mouloucoulay Inoussa, U.S. Appl. No. 15/876,413, USPTO Office Action dated Nov. 24, 2019, 24 pages.

* cited by examiner

| Model ID | Location | Data value | Difference |
|---|---|---|---|
| Model 1 | 39.45N, 74.57W | 45.7 knots | 0.6 mph |
| Model 2 | 39.45N, 74.57W | 32.6 knots | -12.5 mph |
| Model 3 | 39.45N, 74.57W | 60.3 knots | 15.2 mph |
| Model ID | Location | Data value | Difference |
| Model 1 | 39.34N, 74.48W | 52.7 knots | -1.5 mph |
| Model 2 | 39.34N, 74.48W | 43.2 knots | -11.0 mph |
| Model 3 | 39.34N, 74.48W | 59.3 knots | 5.1 mph |

FIG. 10

| FORENSIC WEATHER REPORT SUMMARY | |
|---|---|
| 1802 — Location | 2301 Boardwalk, Atlantic City, NJ 08401 |
| 1804 — Start Time | Oct. 29, 2012, 9:01pm EDT |
| 1806 — Max Storm Surge | 4 feet |
| 1808 — Max Storm Surge Time | 11:01pm EDT, Oct. 29, 2012 |
| 1810 — Max Sustained Wind | 58 mph |
| 1812 — Max Sustained Wind Time | 12:01am EDT, Oct. 30, 2012 |
| 1814 — Peak Wind Gust | 75 mph |
| 1816 — Peak Wind Gust Time | 11:01pm EDT, Oct. 29, 2012 |

1800

FIG. 18

FORENSIC WEATHER SYSTEM

CROSS REFERENCE TO RELATED APPLICATION

This application is a continuation-in-part of U.S. patent application Ser. No. 15/141,109, filed on Apr. 28, 2016, the contents of which are incorporated herein by reference. Application Ser. No. 15/141,109 claims priority to U.S. provisional patent application Ser. No. 62/238,206 filed on Oct. 7, 2015, and U.S. provisional patent application Ser. No. 62/302,921 filed Mar. 3, 2016, the contents of both of which are incorporated herein by reference.

FIELD OF THE INVENTION

The present invention relates generally to meteorology, and more particularly, to a forensic weather system.

BACKGROUND

Severe weather has the potential to cause property damage, economic damage, and most significantly, loss of life. A variety of severe weather phenomena exist. The types of severe weather phenomena that may be encountered depend on various factors such as latitude, altitude, topography, and other atmospheric conditions.

Severe weather may include hurricanes. Hurricanes are large, rapidly rotating storm systems comprising a low-pressure center, and are accompanied by strong winds, thunderstorms, heavy rain, and often cause a storm surge. Each of these elements may produce property damage, land erosion, and other undesirable effects. Hurricanes can occur all over the world, including in the United States, Hawaii and Puerto Rico.

Severe weather may also include "nor'easters". Nor'easters are large storms occurring along the east coast of the United States and Atlantic Canada. Nor'easters cause strong northeast-to-southwest winds that can often cause property damage. Additionally, similar to hurricanes, nor'easters can cause coastal flooding and coastal erosion, also resulting in significant property damage.

A coastal storm brings the risk of a storm surge. A storm surge involves a rising of water above normal levels due to the storm. The combination of strong inbound winds and low pressure can cause sea water to reach residential and commercial areas along the coast. Additional factors such as tides and rainfall may also impact the overall flooding caused by a storm surge.

Forecasting of such storms has improved to provide notice to populations to allow for preparation and evacuations. Nevertheless, powerful storms such as hurricanes, typhoons, nor' easters, and cyclones will continue to impact modern life.

SUMMARY

A forensic weather analyzer compares actual meteorological readings with data from multiple weather models. The data is compared and a forensic weather model is selected as the weather model that most closely matches the meteorological readings. The forensic weather model is then used to provide meteorological information pertaining to a weather event such as a hurricane, at a specific location such as a street address.

In some embodiments, there is provided a computer-implemented method for estimating weather conditions at a subject location at a previous time, comprising: obtaining gridded data pertaining to the subject location; obtaining observed data pertaining to the subject location; performing filtering on the observed data to create filtered observed data; combining the gridded data with the filtered observed data to create a combined dataset; performing a linear regression on the combined dataset; applying a dynamic correction based on distance between subject location and observed data locations; computing an estimated weather condition for the subject location based on the dynamic correction; and generating a report, wherein the report includes the estimated weather condition.

In some embodiments, there is provided an electronic device comprising: a processor; a memory coupled to the processor; the memory containing instructions, that when executed by the processor, perform the steps of: obtaining gridded data pertaining to the subject location; obtaining observed data pertaining to the subject location; performing filtering on the observed data to create filtered observed data; combining the gridded data with the filtered observed data to create a combined dataset; performing a linear regression on the combined dataset; applying a dynamic correction based on distance between subject location and observed data locations; computing an estimated weather condition for the subject location based on the dynamic correction; and generating a report, wherein the report includes the estimated weather condition.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

FIG. 10 shows a table of data for weather models.

FIG. 18 is a report summary from an exemplary forensic weather report.

DETAILED DESCRIPTION

Figure 1:
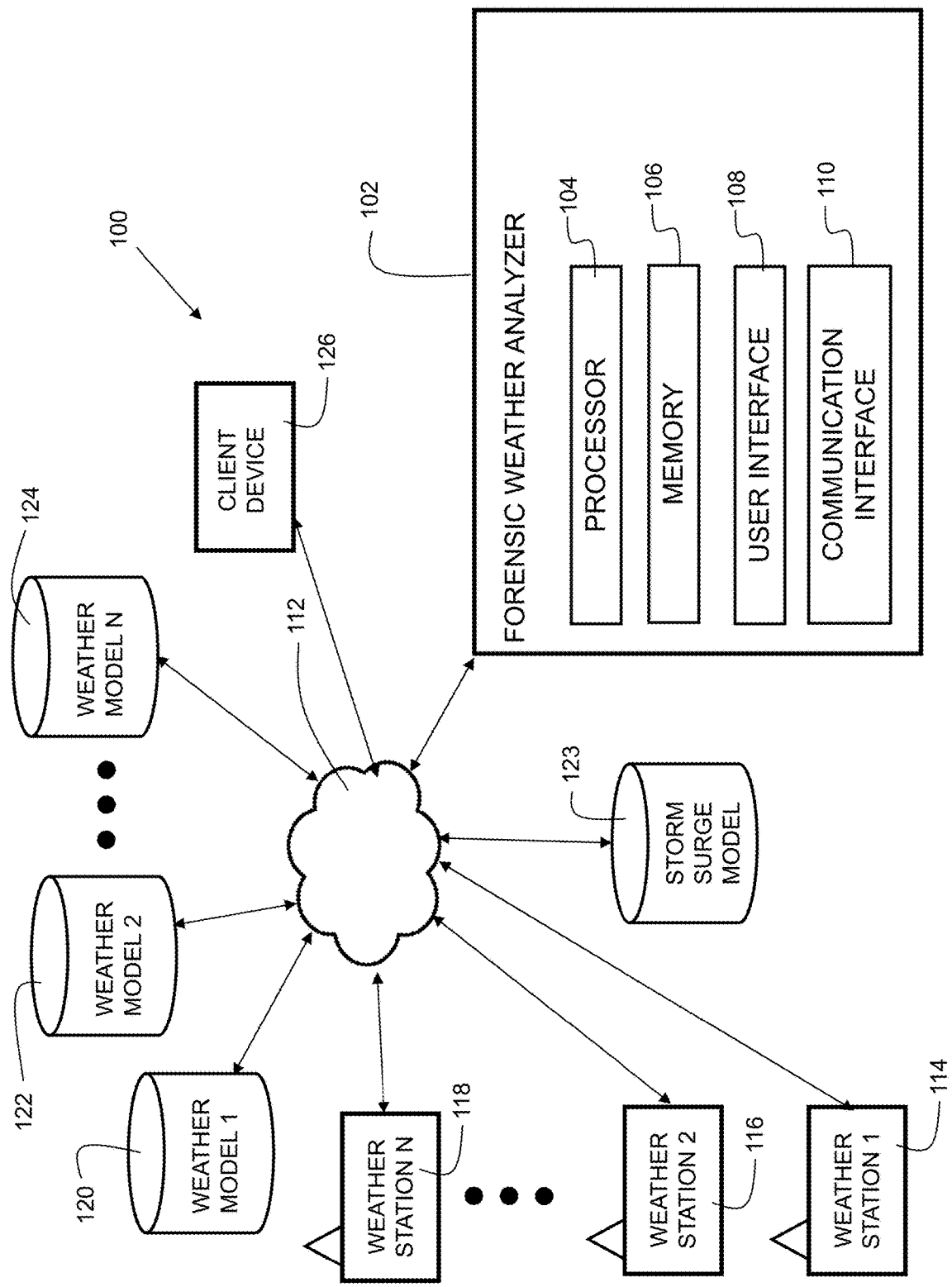
FIG. 1 is a system in accordance with embodiments of the present invention.

Hurricanes, tropical storms, and cyclones can be among the deadliest and most destructive peril because the very strong winds and storm surge/tide that are often associated with them for long periods of time. In 2012, Hurricane Sandy caused an estimated $71.4 billion in damage. Some of that damage was caused by winds and some damage was caused by the storm surge and tides. The biggest question among professionals involved in determining and resolving insurance claims is: Which weather phenomena likely caused the damage and how much damage did each of the weather phenomena cause? When an insurance carrier, for instance, receives a claim, the adjuster they send out is tasked with determining causation. That is, it is desirable to determine if the damage was caused by wind speeds, the storm surge, or both. Additional questions arise when a structure has a high dollar loss or one in which the windows, or entire structure is destroyed. Knowing the wind speeds is also very important for investigations when structures of windows are rated to withstand a certain wind speed. When an adjuster, engineer, attorney or others search for weather records from the official weather stations, they are often faced with many problems. Examples include the following:

1. National Oceanic and Atmospheric Administration (NOAA) surface wind observations are often far from the subject location, sometimes 15-25 miles away. For a scenario involving Hurricane Sandy along the coastline in Barnegat, N.J., the closest NOAA wind observation station was located 23.1 miles away and was approximately 15.8 miles inland. There were no easily identifiable wind records in the area.
2. The weather stations are often located well inland and are not representative of the winds closer to or along the coastline where stronger winds may exist.
3. These weather stations are often far away from the most intense part of the storm.
4. Weather stations often have electricity and communication failures, with the result that meteorological observations may not be taken or recorded.
5. Observers at airports often evacuate and close down their posts, which in doing so stops the recording of wind observations.

Thus, there remains a major void in accurately determining what the sustained wind speeds, wind gusts and storm surge heights were during a hurricane, tropical storm or other significant windstorm. Not only is this true for peak values but also for the timing of these values. This becomes very important when trying to determine the causation of the loss, the value of the loss, and who ultimately is responsible for paying for the damage. Overwhelmingly, the question comes down to whether an insurance company or federal government (National Flood Insurance Program) is responsible for payment, and how much. However, if the winds were never strong enough to cause damage to the structure, then there may be a denial or dispute in coverage. Not only was this a multi-billion dollar question during "Superstorm Sandy," but it was even more of an unknown during Hurricane "Katrina" in 2005. The results have major implications on the home and business owners, the insurance carriers, and the federal government.

To address the aforementioned problems, embodiments of the present invention provide a back-end machine process that provides a localized meteorological estimation including detailed hour-by-hour wind, weather, and storm surge conditions for a specific, user-supplied subject location. Embodiments include archiving of the 00-hour initializations of several computer models every hour, and saving them to a server and/or database, enabling a post-storm verification process.

These computer models estimate numerous meteorological values and measurements and provide a detailed 'snapshot' of the weather conditions, at the ground and well above the ground, for the entire United States, Hawaii, and Puerto Rico. In addition to the weather models, embodiments also incorporate data from the "SLOSH" ("Sea, Lake, and Overland Surges from Hurricane") computer model in order to determine and calculate storm surge heights based on specific storm information and criteria. Further, embodiments may incorporate data from the ADvanced CIRCulation model (ADCIRC) in order to map and determine storm surge flooding, as well as model tides and wind driven circulation. ADCIRC is a hydrodynamic modeling technology that conducts short- and long-term simulations of tide and storm surge elevations and velocities in deep-ocean, continental shelves, coastal seas, and small-scale estuarine systems.

In embodiments, a user can visit a website, enter the address, altitude/longitude pertaining to a subject location, or their current GPS location and view a map to verify the correct location. The user can adjust the location on the mapping program manually to the correct location. The user may be prompted to enter their payment information. As they are doing this, a forensic weather analyzer in accordance with embodiments of the present invention reviews the archives and extracts data for the requested subject location. The end result is an automated, forensic weather report that contains hour-by-hour wind speeds, wind gusts, wind directions, barometric pressures and storm surge heights, as well as graphs of the wind and storm surge data, a color-contoured image of the wind gusts when the maximum wind gusts were achieved and an image of the storm surge height when the maximum storm surge occurred at each specific location that was queried. Thus, the forensic weather report provides a homeowner, insurance adjuster, or other stakeholder with critical information regarding the weather event. Additional details of embodiments are further explained in the following paragraphs.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a diagram 100 of a forensic weather system in accordance with embodiments of the present invention. Forensic weather analyzer 102 may be embodied in a computer comprising a processor 104, a memory 106 coupled to the processor 104, a user interface 108, and a communication interface 110. In embodiments, multiple processors and/or cores may be used. In some embodiments, the forensic weather analyzer 102 may be a distributed computer system. The memory 106 may include a non-volatile memory, such as ROM, flash memory, optical storage, magnetic storage, magnetic hard disks, solid state hard disks, or other suitable technology. In embodiments, the memory 106 may include memory, which is not a transitory signal per se. The user interface 108 may include, but is not limited to, a display, a keyboard, a mouse, a touchscreen, and/or voice directed guidance. The communication interface 110 may include a wired Ethernet port, a Wi-Fi interface, cellular interface, or other suitable interface for communication over network 112. In embodiments, network 112 includes the Internet. In alternative embodiments, network 112 may include a wide area network (WAN), local area network (LAN), cloud network, cellular network, Wi-Fi network, Bluetooth network, and/or another suitable network.

Using communication interface 110, the forensic weather analyzer 102 may communicate with multiple computerized weather stations, indicated as references 114, 116, and 118. While three weather stations are illustrated in FIG. 1, in practice many more (or fewer) weather stations may be utilized. Each weather station comprises hardware to provide meteorological measurements to the forensic weather analyzer 102. In some embodiments, the meteorological measurements may be provided unsolicited by the weather stations. In other embodiments, the meteorological measurements may be provided in response to a query from the forensic weather analyzer 102. In some embodiments, a combination of queried and unsolicited measurements may be used.

In embodiments, the forensic weather analyzer 102 may interact with a client device 126. The client device may render a user interface that accepts data to be entered into fields of a web page. The data may then be communicated to the forensic weather analyzer 102 via network 112. The data may include temporal event data, which pertains to a particular time or time interval of interest. The data may also include a subject location, which pertains to a location for which forensic weather data is desired. Thus, a user may be able to access a web page via the client device 126, and enter the pertinent information to enable generation of a forensic weather report by the forensic weather analyzer 102. The client device 126 includes a communication interface to enable communication over network 112. In embodiments, the client device 126 may include a PC, a laptop, a tablet computer, or a mobile phone. In some embodiments, the client device may include a camera, and/or a satellite positioning receiver such as a Global Positioning System (GPS) receiver.

The forensic weather analyzer 102 may interact with multiple weather models, indicated as references 120, 122, and 124. While three weather models are illustrated in FIG. 1, in practice many more weather models may be utilized. The weather models may be implemented on computers that provide application programming interfaces (APIs) and/or other mechanisms such as Simple Object Access Protocol (SOAP), and/or JSON (JavaScript Object Notation) to enable model data to be retrieved by the forensic weather analyzer 102. Data may be exchanged in a variety of formats, including, but not limited to, Extensible Markup Language XML, GRIB (Gridded Binary), and or CDF (Common Data Format).

Weather models 120, 122, and 124 may include, but are not limited to, a rapid refresh model (RR), a High Resolution Rapid Refresh (HRRR) model, and/or a Real Time Meso Analysis (RTMA) model. Additionally, one of the models may be a storm surge model 123, such as Sea, Lake, and Overland Surges from Hurricanes (SLOSH) model or an ADvanced CIRulation (ADCIRC) model. Other storm surge models may also be used instead of, or in addition. Storm surge models are used for estimating storm surge at a given time (or time window) and subject location.

The Rapid Refresh (RR) numerical weather is operated by the National Centers for Environmental Prediction (NCEP). The RR runs with two versions. The first generates weather data on a 13-km (8-mile) resolution horizontal grid, and the second, the High-Resolution Rapid Refresh (HRRR), generates data down to a 3-km (2-mile) resolution grid for smaller regions of interest. RR forecasts are generated every hour with forecast lengths going out 18 hours. Multiple data sources go into the generation of RR forecasts, including, but not limited to, commercial aircraft weather data, balloon data, radar data, surface observations, and satellite data.

The Real-Time Mesoscale Analysis (RTMA) is a National Oceanic and Atmospheric Administration (NOAA)/NCEP high-spatial and temporal resolution analysis/assimilation system for near-surface weather conditions. Its main component is the NCEP/EMC Gridpoint Statistical Interpolation (GSI) system applied in two-dimensional variation mode to assimilate conventional and satellite-derived observations.

The RTMA provides field forecasters with high quality analyses for nowcasting, situational awareness, and forecast verification purposes. The system currently produces hourly analyses at 5 km and 2.5 km resolution for the Conus NDFD grid, 6 km for the Alaska NDFD grid and 2.5 km for the Hawaii, Puerto-Rico, and Guam NDFD grids.

The ADCIRC model is a computerized model for solving the equations of motion for a moving fluid on a rotating earth. According to the introduction to the User Manual available at www.ADCIRC.org, these equations have been formulated using the traditional hydrostatic pressure and Boussinesq approximations and have been discretized in space using the finite element (FE) method and in time using the finite difference (FD) method. Specifications for the model are described in a Fact Sheet available from the US Army Corps of Engineers, at http://www.erdc.usace.army.mil/Media/Fact-Sheets/Fact-Sheet-Article-View/Article/476698/advanced-circulation-model/, as follows:

Elevation obtained from the solution of the depth-integrated continuity equation in Generalized Wave-Continuity Equation (GWCE) form Velocity obtained from the solutions of either the 2DDI or 3D momentum equations, retaining all nonlinear terms Operation runs with either a Cartesian or a spherical coordinate system GWCE solved using either a consistent or a lumped mass matrix (via a compiler flag) and an implicit or explicit time stepping scheme (via variable time weighting coefficients)

2DDI momentum equations are lumped and require no matrix solver. In 3D, vertical diffusion is treated implicitly and the vertical mass matrix is not lumped, requiring the solution of a complex, tri-diagonal matrix problem over the vertical at every horizontal node Least squares analysis routine computes harmonic constituents for elevation and depth-averaged velocity during the course of the run thereby avoiding the need to write out long time series for post processing Optimized by unrolling loops for enhanced performance on multiple computer architectures and includes MPI library calls for high-efficiency (typically better than 90 percent) operation on parallel computer architectures The Sea, Lake, and Overland Surges from Hurricanes (SLOSH) model is a computerized numerical model developed by the National Weather Service (NWS) to estimate storm surge heights resulting from historical, hypothetical, or predicted hurricanes by taking into account the atmospheric pressure, size, forward speed, and track data. These parameters are used to create a model of the wind field which drives the storm surge.

The SLOSH model includes a set of physics equations which are applied to a specific locale's shoreline, incorporating the unique bay and river configurations, water depths, bridges, roads, levees, and other physical features.

The SLOSH model may utilize multiple techniques, alone or in combination, to estimate a surge:

Deterministic Approach—Forecasts surge based on solving physics equations. This approach uses a single simulation based off of a "perfect" forecast which results in a strong dependence on accurate meteorological input. The location and timing of a hurricane's landfall is crucial in determining which areas will be inundated by the storm surge. Small changes in track, intensity, size, forward speed, and landfall location can have huge impacts on storm surge.

Probabilistic Approach—The Probabilistic Surge (P-Surge) product incorporates statistics of past forecast performances to generate an ensemble of SLOSH runs based on distributions of cross track, along track, intensity, and size errors. The latest version explicitly models the astronomical tide.

Composite Approach—Predicts surge by running SLOSH several thousand times with hypothetical hurricanes under different storm conditions. The products generated from this approach are the Maximum Envelopes of Water (MEOWs) and the Maximum of MEOWs (MOMs) which is regarded by the National Hurricane Center (NHC) as the best approach for determining storm surge vulnerability for an area since it takes into account forecast uncertainty. The MEOWs and MOMs play an integral role in emergency management as they form the basis for the development of the nation's evacuation zones.

The data from weather models 120, 122, and 124 may be hosted on one or more data servers. Data, in a format such as, without limitation, GRIB, GRIB2, XML, or CDF, may be accessed by forensic weather analyzer 102 via network 112. The GRIB standard is well suited for transmitting large volumes of gridded data to data centers over high-speed telecommunication lines using modern protocols. By packing information into the GRIB code, messages can be made more compact than character-oriented bulletins, which enables faster computer-to-computer transmissions. GRIB can also serve as a data storage format, generating the same efficiencies relative to information storage and retrieval devices.

A GRIB2 message includes multiple parameters with values located at an array of grid points or represented as a set of spectral coefficients. Logical divisions of the message are designated as sections, each of which provides control information and/or data. There are multiple sections within a message. An indicator section includes its identification as a GRIB message, and includes a message length. An identification section includes a section length, section number, and characteristics that apply to all processed data in the GRIB message. An optional local use section contains additional items for local use by originating centers. A Grid Definition Section includes a definition of grid surface and geometry of data values within the surface. A Product Definition Section includes a description of the nature of the data. A Data Representation Section includes a description of how the data values are represented. A Bit-Map section includes an indication of presence or absence of data at each grid point, as applicable.

A sample use case of embodiments of the present invention may include a user desiring to obtain forensic weather information for a given subject location and event window. For example, the user may wish to obtain information about sustained winds at a particular address during a recent hurricane. The user enters subject location information and the event window of interest via client device 126. The information is transmitted to forensic weather analyzer 102 via network 112. The forensic weather analyzer retrieves actual meteorological measurements from one or more of the weather stations (114, 116, and/or 118). The meteorological measurements may have been taken at some distance (e.g., several miles) from the subject location, and thus may not be representative of conditions experienced at the subject location. Thus, the forensic weather analyzer 102 compares the meteorological measurements against simulated data from the plurality of weather models 120, 122, and/or 124. The forensic weather analyzer 102 selects the weather model that most accurately aligns with the meteorological measurements from one or more of the weather stations (114, 116, and/or 118). This selected weather model is the forensic weather model. The forensic weather model is then queried for the given time frame (event window) at the given subject location, or within the closest resolution provided by the forensic weather model. The data from the forensic weather model is then formatted into a report with textual and visual/graphical information and provided to the user from the forensic weather analyzer 102 to the client device 126 via network 112. Some embodiments include the forensic weather analyzer and at least one weather station, where the weather station includes at least one anemometer. In this way, the user can receive an assessment of conditions at the subject location during the time period of interest.

Figure 2:
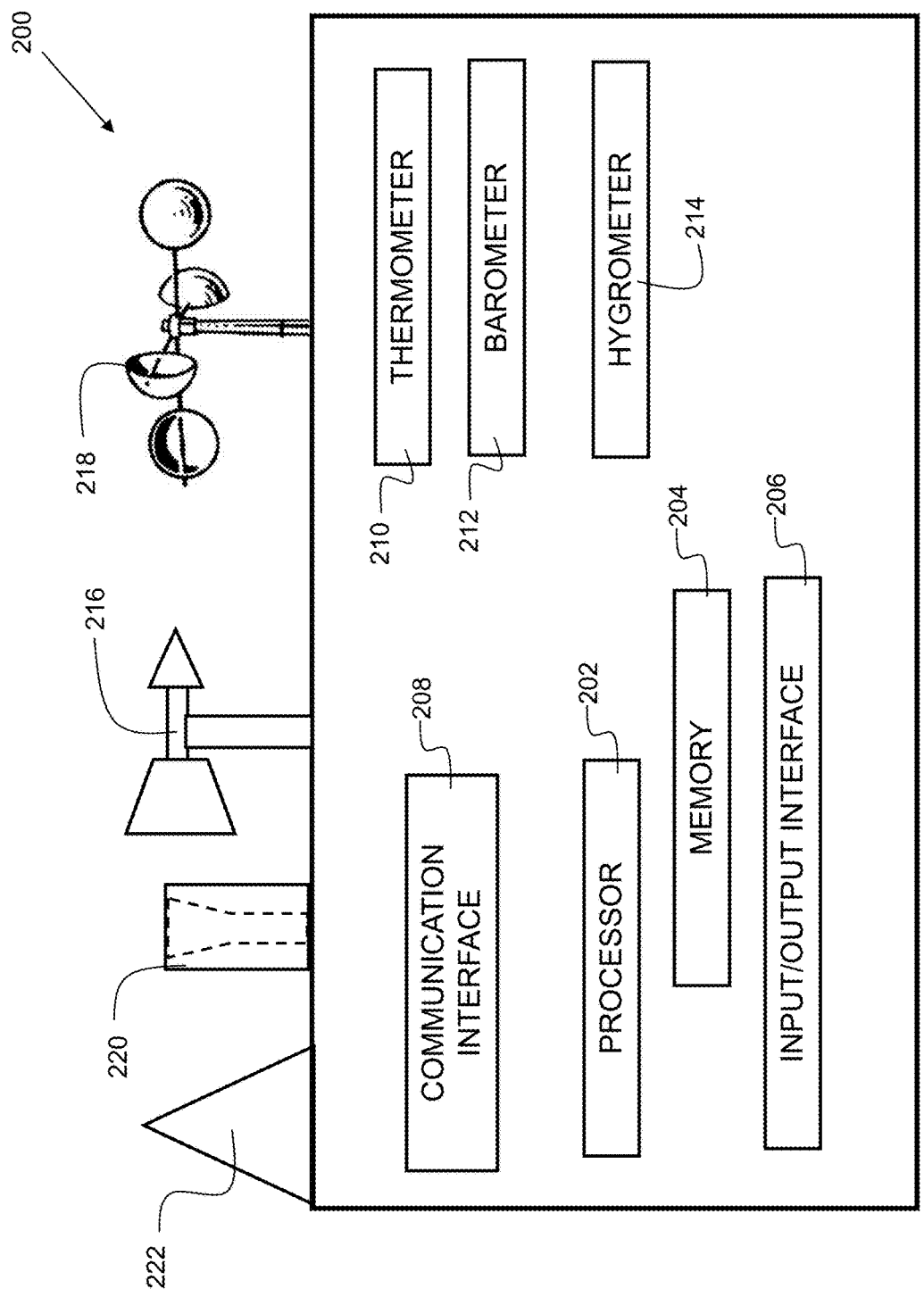
FIG. 2 shows details of a weather station.

FIG. 2 shows details of a weather station 200 in accordance with embodiments of the present invention. Weather station 200 comprises a processor 202, coupled to a memory 204. In embodiments, multiple processors and/or cores may be used. In some embodiments, the weather station 200 may include a distributed computer system. The memory 204 may include a non-volatile memory such as ROM, flash memory, optical storage, magnetic storage, magnetic hard disks, solid state hard disks, or other suitable technology. In embodiments, the memory 204 is not a transitory signal per se. The weather station 200 further comprises an input/output (I/O) interface 206 to receive inputs from various meteorological instruments. Each instrument outputs a digital and/or analog signal that is read by the processor via the I/O interface. The meteorological instruments may include, but are not limited to, an anemometer 218, a thermometer 210, a barometer 212, a hygrometer 214, a rain (precipitation) gauge 220, a wind direction indicator 216, and/or any other suitable tools. Weather station 200 may further comprise an antenna 222 to facilitate wireless communication via a cellular network, Wi-Fi network, Bluetooth network, the Internet and/or other suitable network such that data from weather station 200 can be transmitted via network 112 (FIG. 1) to forensic weather analyzer 102 (FIG. 1). Weather station 200 may be similar to weather stations 114, 116, and 118 illustrated in FIG. 1.

The hygrometer 214 may be used for measuring the moisture content in the atmosphere. Temperature data may be provided by thermometer 210. Barometric pressure may be provided by barometer 212. Rainfall amounts may be provided by rain gauge 220. Wind speed may be provided by anemometer 218, and wind direction may be provided by wind direction indicator 216. In embodiments, each weather station stores a certain amount of history in its memory 204. The history (recorded meteorological measurements) may be periodically retrieved by the forensic weather analyzer 102 (FIG. 1), for long term storage on the forensic weather analyzer or other networked storage or database.

Figure 3:
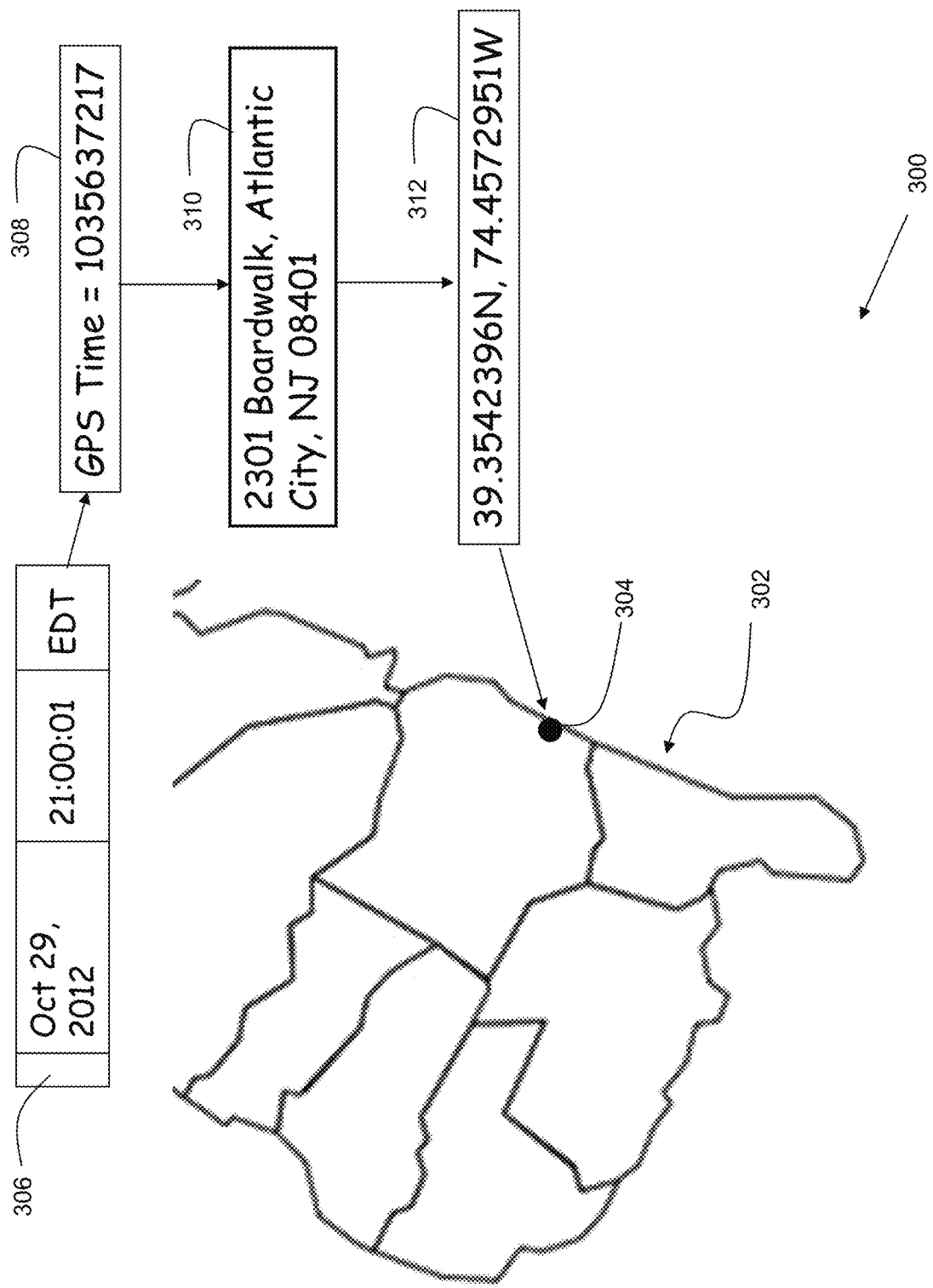
FIG. 3 shows a map indicating a subject location.

FIG. 3 shows diagram 300 of a map 302 indicating a subject location 304. In this example, the subject location 304 is on the coast of southern New Jersey. Diagram 300 further shows a flow of information for starting a forensic weather analysis. The flow includes establishing a time of interest 306, which forms the basis of an event window. For example, the time of interest may be interpreted as a start time for a five-hour time window. In other embodiments, a user may specify the time of interest along with a desired time window. In such embodiments, a user may specify a time window of 12 hours, 24 hours, or other suitable interval corresponding to a weather event. The flow may continue with converting the time of interest to an epoch start time 308. The epoch start time may be in the form of GPS seconds, UNIX seconds, UTC time, or other suitable format. In this way, the event time is independent of time zone and daylight savings time settings. The flow may continue with entering a street address 310 of a subject location. The flow may then continue with converting the street address 310 to a latitude-longitude coordinate pair 312.

Figure 4:
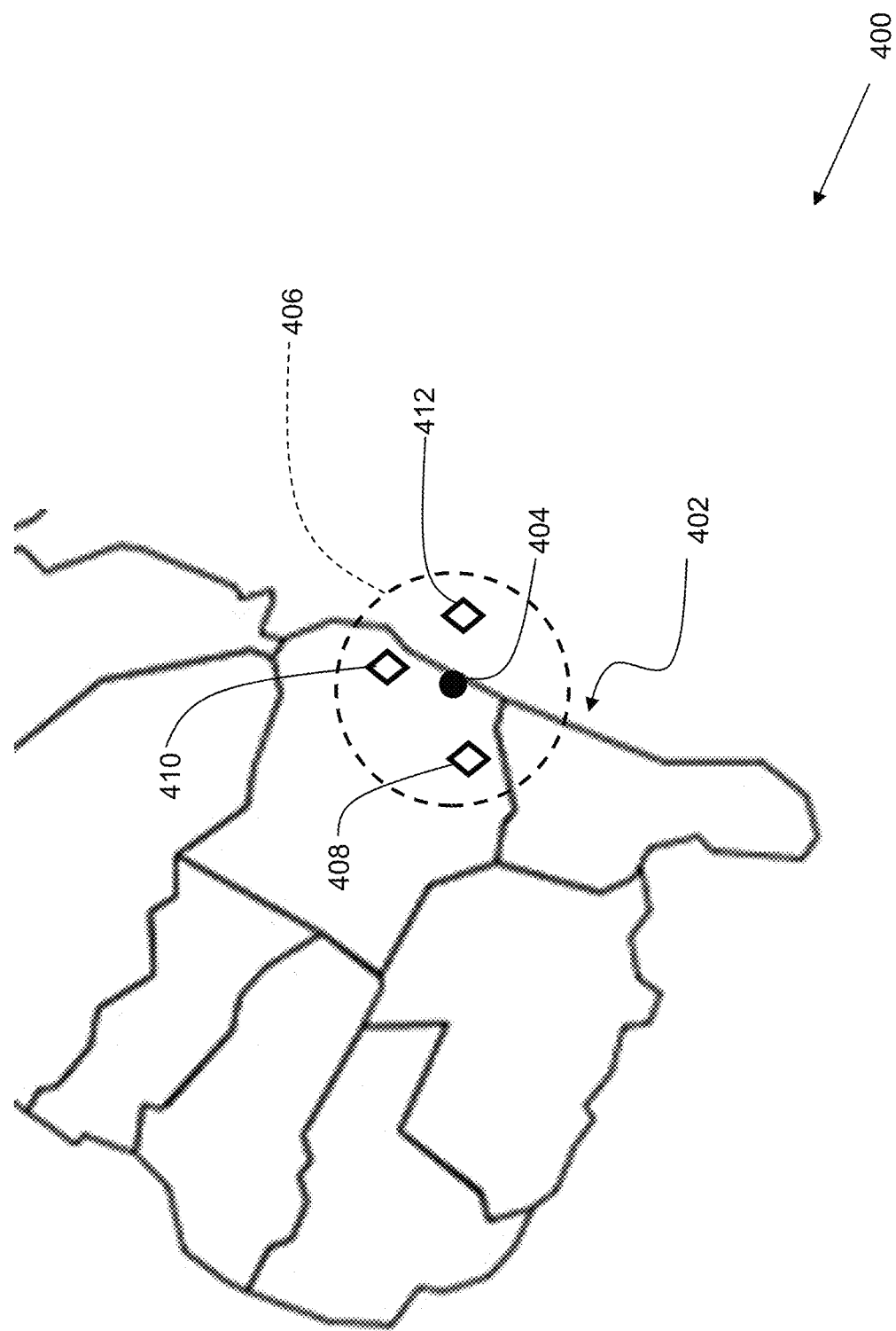
FIG. 4 shows a map indicating a measurement region.

FIG. 4 shows diagram 400 of a map 402 indicating a measurement region 406. The measurement region 406 may be defined such that the subject location 404 is centered within the measurement region 406. The measurement region 406 encompasses multiple weather stations indicated as 408, 410, and 412. Each weather station may be similar to weather station 200 shown in FIG. 2. The forensic weather analyzer 102 (FIG. 1) utilizes measurements from weather stations within the measurement region 406 to perform an assessment of various weather models in order to select a forensic weather model.

Figure 5:
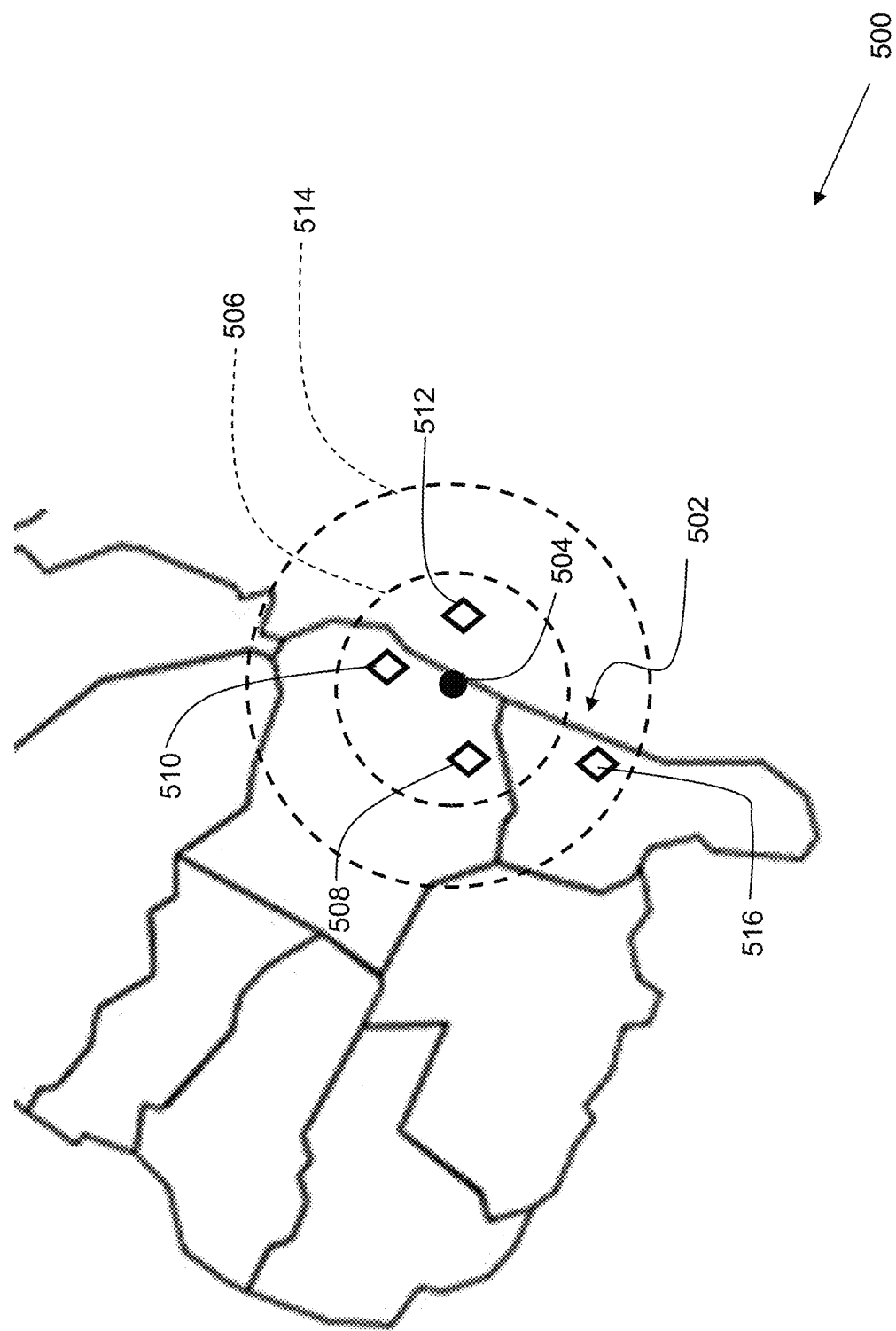
FIG. 5 shows a map indicating a secondary measurement region.

FIG. 5 shows diagram 500 of a map 502 indicating a secondary measurement region in accordance with alternative embodiments. In some embodiments, a default measurement region 506 may be selected, based on the subject location 504. For example, the default measurement region 506 may be defined by a circle of a predetermined radius (e.g. 5 miles). In some cases, there may only be few weather stations (508, 510, and 512) in the default measurement region 506. In such cases, the forensic weather analyzer 102 (FIG. 1) may establish a secondary measurement region 514 in order to encompass additional weather stations, such as 516. A higher number of weather stations within the measurement region allow more comparisons between model data and real-world meteorological measurements. In some embodiments, rather than establishing a secondary measurement region, the default measurement region 506 may be expanded in radius until a predetermined number of weather stations are included or a maximum radius is reached. For example, in one embodiment, the forensic weather analyzer is configured to start with a 3-mile radius default region, and attempts to encompass at least 5 weather stations. If there are fewer than 5 weather stations, the radius is incrementally increased (e.g. at mile increments). Each time the radius is increased, a count of included weather stations is made. If the number of weather stations reaches 5, the process is complete. If the number of weather stations is still fewer than 5, the radius increases up to a maximum value (e.g. 30 miles). Once the radius reaches its maximum value, it uses the number of weather stations included in the measurement region for input data used in making a selection of a forensic weather model. In embodiments, the processor 104 of the forensic weather analyzer 102 executes instructions in memory 106 to perform the aforementioned process of expanding the measurement region.

Figure 6:
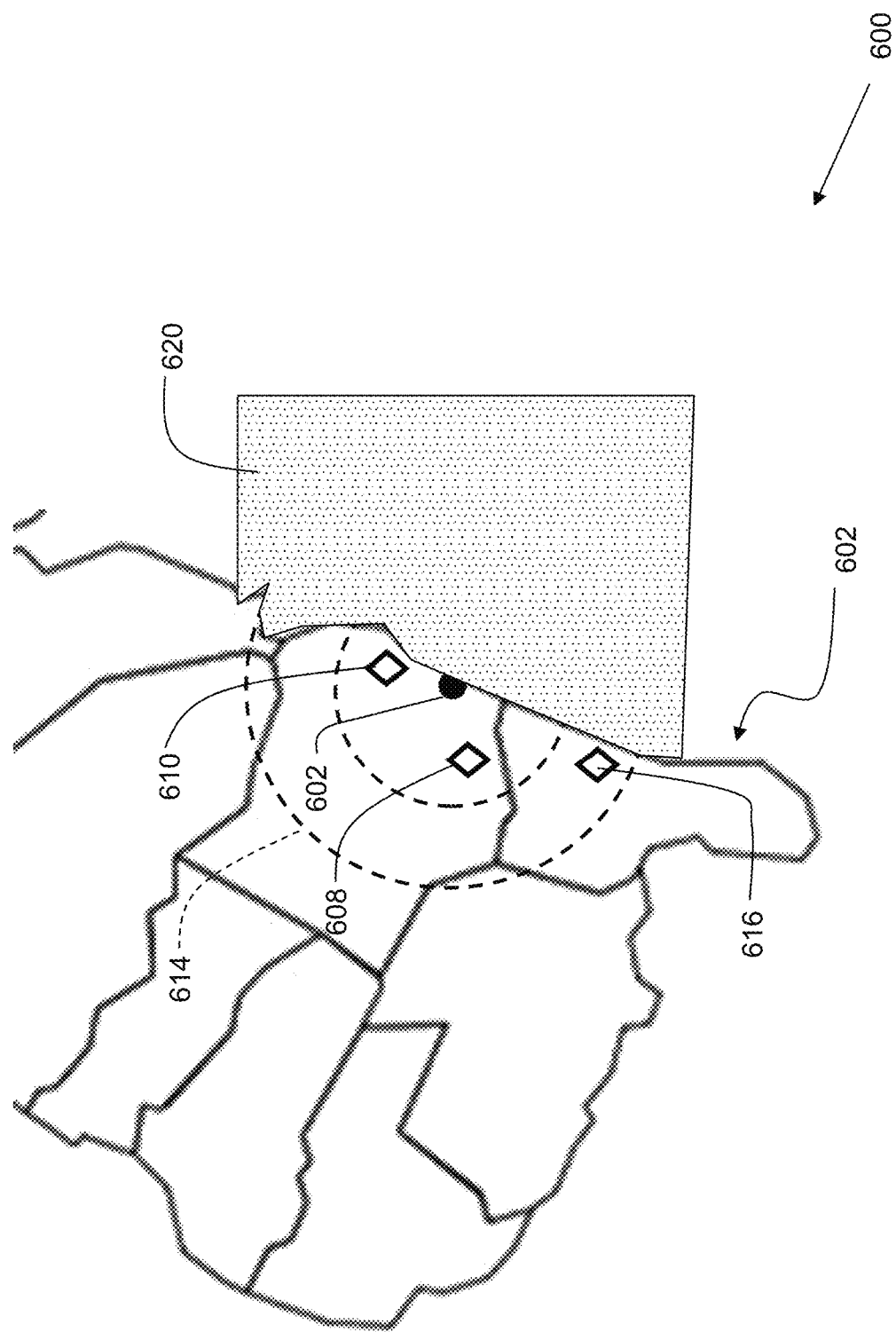
FIG. 6 shows a map indicating a geological exclusion zone.

FIG. 6 shows diagram 600 of a map 602 indicating a geological exclusion zone 620. In this example, the measurement region 614 is reshaped based on an intersection with a geological boundary. In this case, the geological boundary is the boundary between the land of New Jersey and the Atlantic Ocean. In certain cases, it may be desirable to discard data from certain weather stations within the measurement region. For example, referring again to FIG. 5, weather stations 508, 510, and 516 are land-based weather stations, while weather station 512 is on the ocean (e.g. located on a buoy, oil rig, or other ocean-based structure). In some embodiments, a geological exclusion zone 620 can be established along the boundary of a geological feature (e.g. an ocean, lake, mountain range, etc. . . . ) to eliminate weather stations within the exclusion zone. For example, wind speeds may be much higher over an open ocean than on land. Thus, even if an ocean-based weather station is within the measurement region, it may be better to discard its data under certain conditions. Thus, in FIG. 6, only weather stations 610, 608, and 616 are used in determining the forensic weather model. In embodiments, the processor 104 of the forensic weather analyzer 102 utilizes a database of geological features to determine if there is overlap between a geological feature and a measurement region. If there is overlap, a user may be provided with an option to create a geological exclusion zone for those feature(s).

Figure 7:
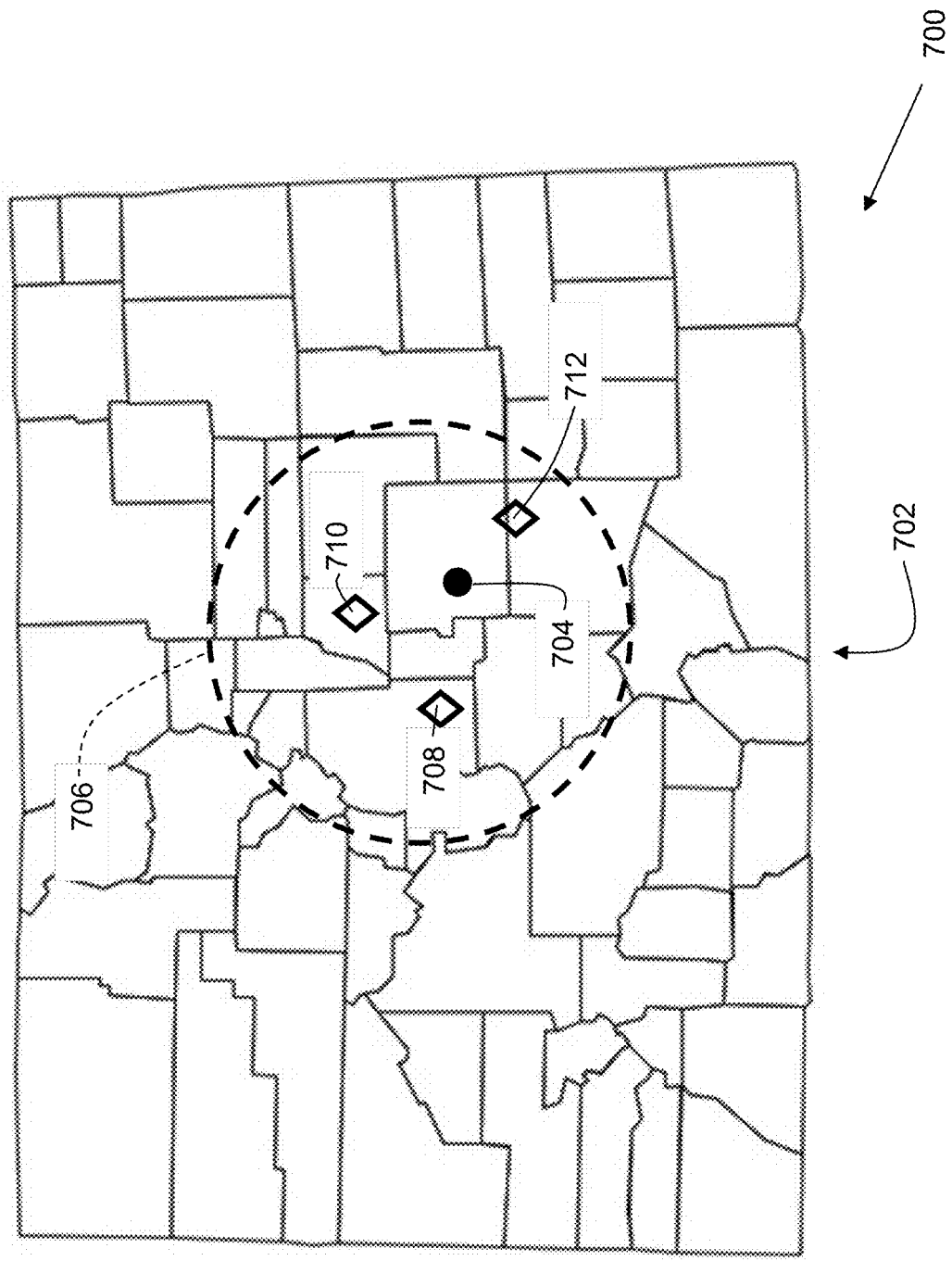
FIG. 7 shows another example of a map indicating a subject location.

FIG. 7 shows diagram 700 including another example of a map 702 indicating a subject location 704. In this case, the subject location is within Colorado. A measurement region 706 includes three weather stations, indicated as 708, 710, and 712. Colorado has a wide variety of elevations, as it has plains and mountain ranges. In some embodiments, a geological exclusion zone may be utilized to remove weather stations at higher elevations. For example, suppose that the subject location 704 is at a 5000-foot elevation (above sea level), and weather station 708 is at 8000 feet above sea level, weather station 710 is at 5300 feet above sea level, and weather station 712 is at 4900 feet above sea level. In such a scenario, wind and temperature data may vary considerably between the subject location and the weather station 708. In such a case, a model that closely matches the weather station 708 may not necessarily be a close match for the other stations. Thus, an exclusion zone can be used to remove weather station 708.

Figure 8:
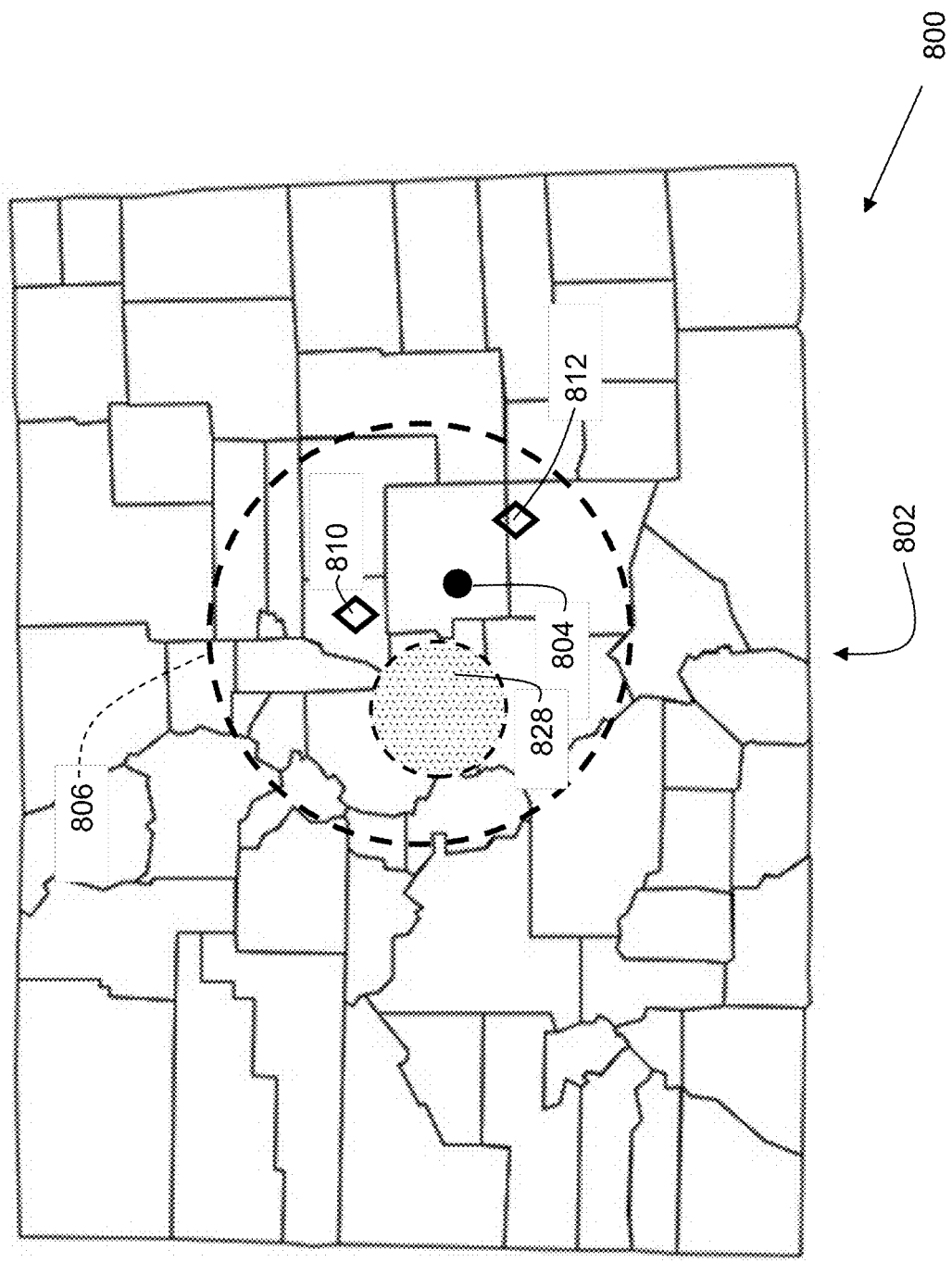
FIG. 8 shows another example of a map indicating a geological exclusion zone.

FIG. 8 shows diagram 800 another example of a map 802 indicating a geological exclusion zone 828 for a measurement region 806 centered around a subject location 804. The geological exclusion zone 828 removes a weather station from consideration when determining a forensic weather model. As shown in FIG. 8, weather stations 810 and 812 are used for determining the forensic weather model, whereas there is no weather station in FIG. 8 corresponding to weather station 708 of FIG. 7, due to the geological exclusion zone 828. In embodiments, the processor 104 of the forensic weather analyzer 102 compares elevations of the subject location and each weather station, and may generate an exclusion zone for weather stations located at an elevation that exceeds a predetermined threshold from the subject location. In the example above, with a threshold of plus or minus 1500 feet, weather stations 710 and 712 are included, while weather station 708 is excluded. Thus, with the geological exclusion zone 828, weather station 708 is not used in determining the forensic weather model.

Figure 9:
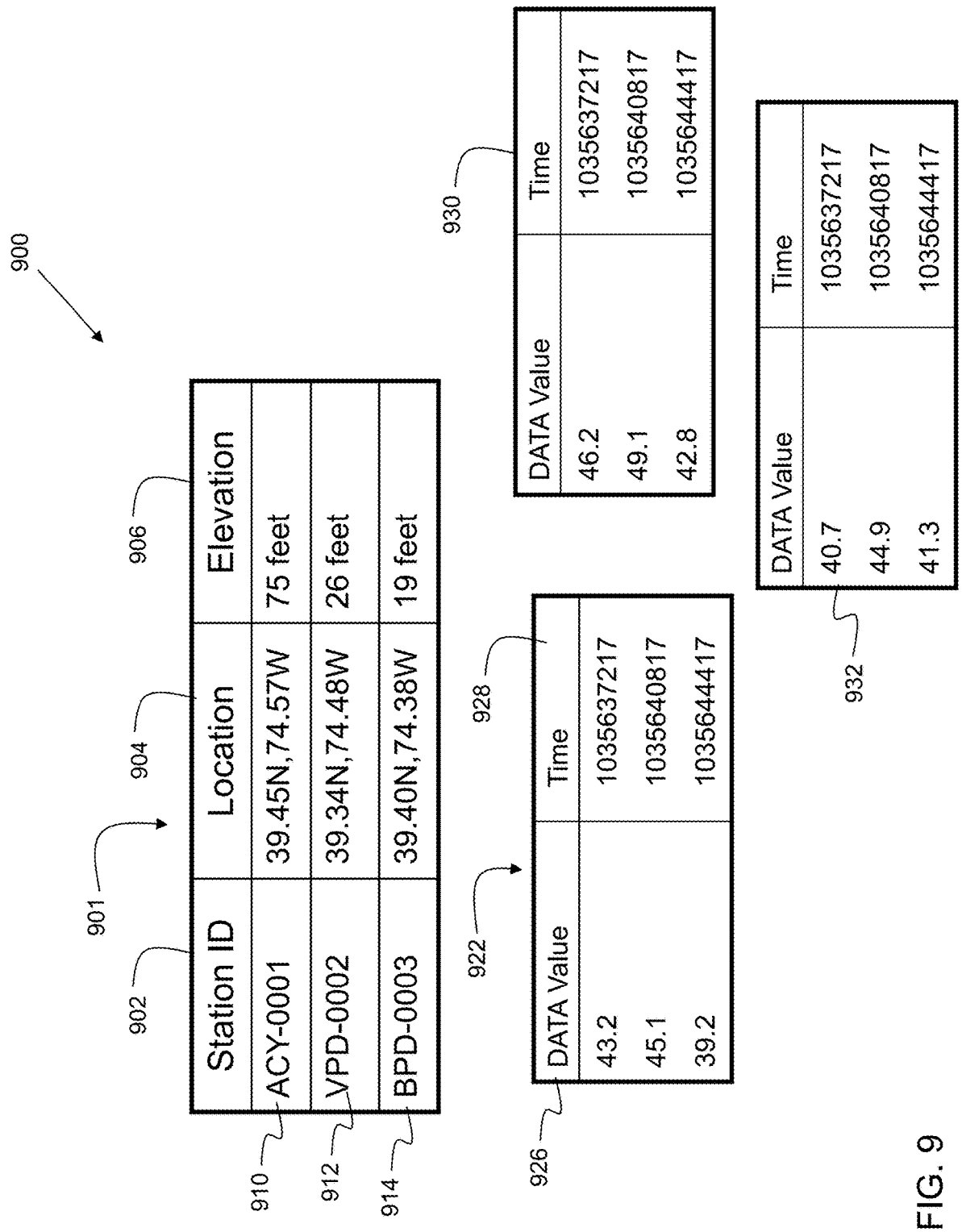
FIG. 9 shows tables of data for weather stations.

FIG. 9 shows a set of tables 900 for weather stations. Table set 900 may be stored within memory 106 of forensic weather analyzer 102. Table set 900 includes station table 901. Station table 901 may include a station identifier field 902, which provides an alpha-numeric identifier for a given weather station. The table 901 may include a location field 904, which indicates a location for a given weather station. In embodiments, the location may be represented in a latitude-longitude format. The table 901 may include an elevation field 906, which provides the altitude of the weather station with respect to sea level. The table 901 contains basic weather station information. In embodiments, the table 901 may be implemented in a relational database format, in which the data is accessible through structured query language (SQL) commands. The table 901 may be linked to meteorological measurement tables (922, 930, and 932). A measurement table 922 contains data values for the weather station of row 910. The measurement table 922 includes a data value column 926, and a time column 928. Thus, for each weather station in column 902, a corresponding measurement table such as 922 contains meteorological measurements acquired at a time indicated in column 928 (e.g., table 930 for row 912, and table 932 for row 914). In embodiments, the time value in column 928 is represented in GPS seconds. In embodiments, multiple data value columns may be present in table 922. The data columns may include, but are not limited to, temperature data, sustained wind speed data, peak wind gust speed data, humidity data, rainfall data, and/or average wind direction data, among others. Similarly, the weather station in row 912 has corresponding measurement table 930, and the weather station in row 914 has corresponding measurement table 932. Note that for clarity, not all columns of the measurement tables are shown. However, each measurement table (922, 930, and 932) may further include additional columns such as station identifier, and any other columns needed to allow relational database operations between the tables of table set 900.

In practice, multiple data fields may be recorded for each weather station. Furthermore, the multiple data fields may be recorded for multiple times. For example, measurements can be recorded on a periodic interval (e.g. hourly, or every ten minutes, etc. . . . ). Thus, for a given time, it is possible to retrieve the meteorological measurements from the weather station at that time. In some embodiments, if a user requests a time for which no meteorological measurement was recorded, then the processor 104 of the forensic weather analyzer 102 may retrieve the data values acquired at a time nearest to the requested time. The processor 104 may compute a difference between a requested time and an actual time within a time column of a measurement table, and retrieve the measurement with the minimum time difference between requested time and actual time.

FIG. 10 shows a weather model table 1000. Table 1000 may be stored within memory 106 of forensic weather analyzer 102. The table 1000 may include a model identifier field 1002, which provides an alpha-numeric identifier for a given weather model. The table 1000 may include a location field 1004, which includes a location for which an estimated data value from the model pertains. The table 1000 may include a data value field 1006, which includes a magnitude of an estimated data value from the model. For example, the data value may refer to sustained wind speed, peak wind gust speed, or other meteorological value that is capable of being estimated by the model for a given time and location. The table 1000 may include a difference field 1008 which includes a difference between an estimated value from a model and a measured value from a weather station. Row 1010 shows information from model 1 at a first location. Row 1012 shows information from model 2 at a first location. Row 1014 shows information from model 3 at a first location. Row 1016 shows information from model 1 at a second location. Row 1018 shows information from model 2 at a second location. Row 1020 shows information from model 3 at a second location. In embodiments, multiple tables within a relational database may be used to facilitate queries of data from multiple weather stations and multiple models at multiple locations for various times. The differences are used to qualify which model is best for a given circumstance. In the example of FIG. 10, model 1 (indicated in row 1010 and 1016) has the smallest absolute value of the difference, and thus is the best model. Other embodiments may use more sophisticated techniques for determining the best model, such as using weighted constants, and factoring in distance from the subject location.

In some embodiments, a Mean Absolute Error (MEA) is computed for each model over a plurality of weather stations. The MEA may be used to qualify each of the multiple models. Below is an example table of data for wind error by station, for a given model.

The MEA for multiple models can be computed. Below is an example of MEA values for three different models for a storm.

| STATION | Sustained Wind Error | Gust Wind Error | Sample Size |
| --- | --- | --- | --- |
| VAF | 5.660 | 2.546 | 41 |
| VCT | 6.662 | 5.653 | 42 |
| VKY | 6.945 | 6.945 | 43 |
| VTI | 7.511 | 7.101 | 48 |
| XBP | 7.798 | 7.599 | 43 |

In the example table above, Model 1 is the forensic weather model, as it has the lowest MEA amongst the three models.

| Model | MEA |
| --- | --- |
| Model 1 | 2.92328085106383 |
| Model 2 | 3.46315744680851 |
| Model 3 | 5.21126808510638 |

Additionally, embodiments of the present invention may also automatically perform a quality control check on the data returned in a forensic weather report. This feature uses the same observed data available to the model verification step above. The system determines the distance from the subject location to each relevant weather station. For stations less than a predetermined distance from the subject location, a distance-weighted average between the estimated data and observed data is computed. Data extraction dates are storm specific and determined by an administrator when creating a weather event, or alternatively can be automated as part of the forensic weather report generation process.

Figure 11:
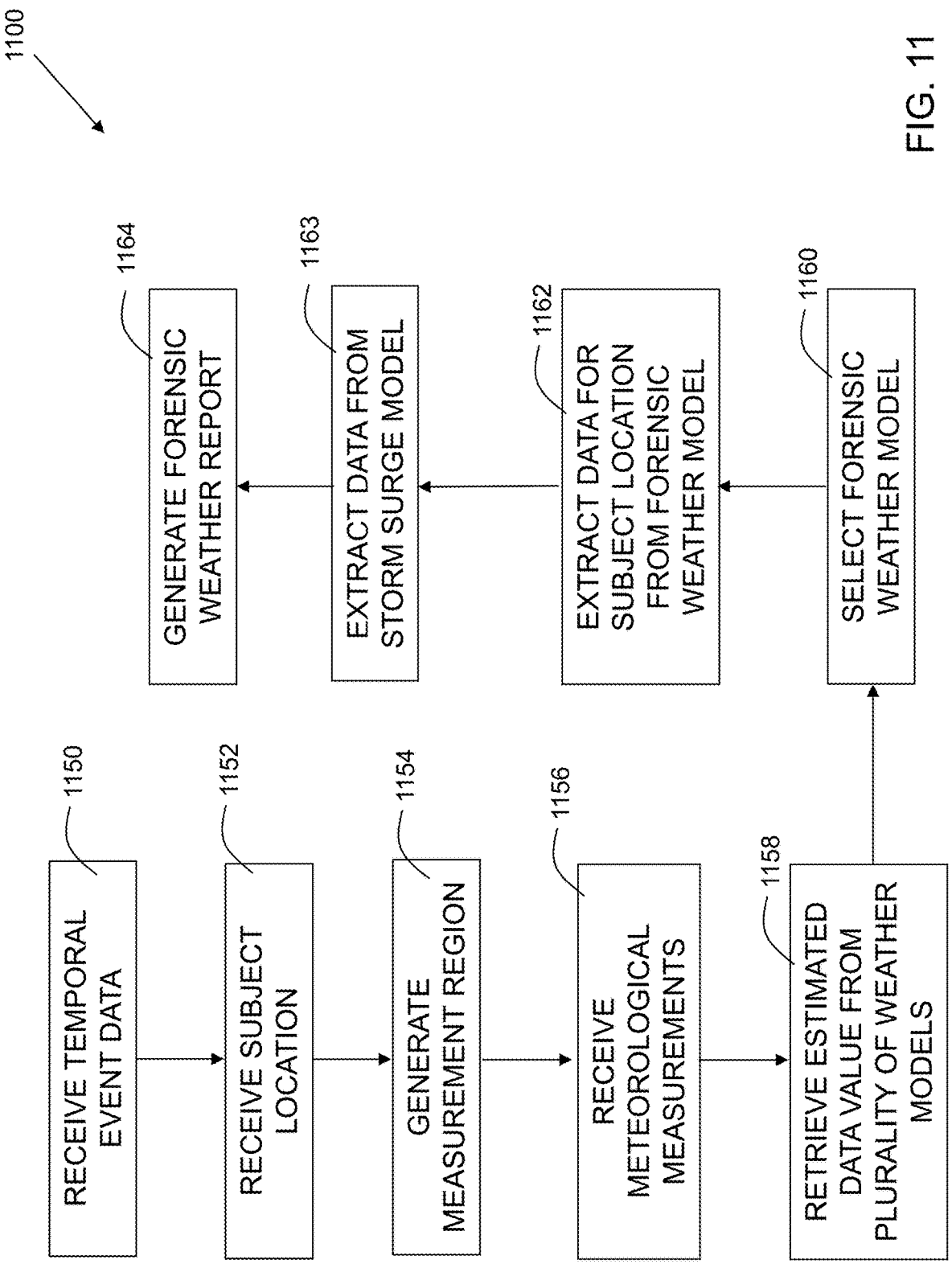
FIG. 11 is a flowchart indicating process steps for embodiments of the present invention.

FIG. 11 is a flowchart 1100 indicating process steps for embodiments of the present invention. In process step 1150, temporal event data is received. This indicates the event window, which is the time period of interest for which a forensic weather analysis is to be performed. In process step 1152, a subject location is received. This indicates a location for which a forensic weather analysis is to be performed. In process step 1154, a measurement region is generated. The measurement region is a region in which weather stations are queried for actual meteorological measurements. An example of a measurement region is indicated as 706 in FIG. 7. In process step 1156, meteorological measurements are received. These measurements may come from weather stations such as those indicated in FIGS. 1 (114, 116, and 118). In process step 1158, estimated data values from a plurality of weather models are retrieved. In some embodiments, this step also includes retrieval of estimated data values from at least one storm surge model. These may include weather models such as those indicated in FIG. 1 (120, 122, and 124), or storm surge model 123 of FIG. 1. In process step 1160, a forensic weather model is selected from amongst the weather models that were used to retrieve data in process step 1158. The forensic weather model is the model that best represents the actual conditions of the subject location over the time period as defined by the event window. In process step 1162, the data for the subject location is extracted from the forensic weather model. In process step 1163, data is extracted from the at least one storm surge model (e.g., 123 of FIG. 1), such as a SLOSH model, an ADCIRC model, or another suitable storm surge model. In embodiments, this may supplement data from other weather models. In process step 1164, a forensic weather report is generated. The forensic weather report may include textual and/or graphical information based on data from the forensic weather model.

Note that embodiments are not limited to the ordering of the steps as described in FIG. 11. Some elements may be performed in a different order, simultaneously, or some elements may be omitted where feasible. Further additional elements may be added in between the elements described herein where feasible. Accordingly, any suitable combination that does not depart from the spirit of the invention is included within the scope of the invention. For example, in some embodiments, data may be retrieved and extracted from only a storm surge model without any retrieval or extraction from a weather model.

Figure 12:
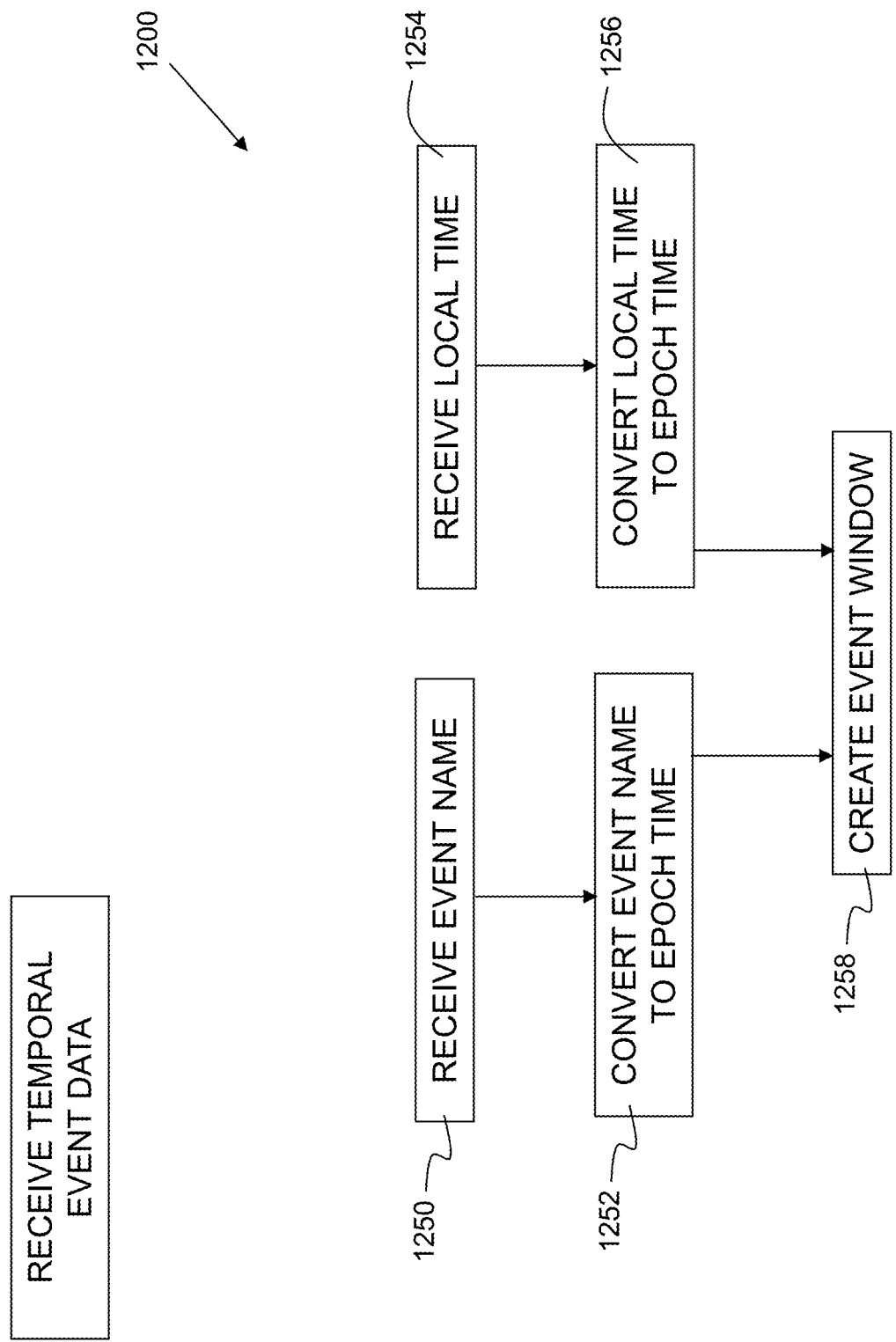
FIG. 12 is a flowchart indicating process steps for receiving temporal data.

FIG. 12 is a flowchart 1200 indicating process steps for receiving temporal data. This flowchart shows some additional sub-steps of step 1150 of flowchart 1100 of FIG. 11. In process step 1250, an event name is received. In practice, the event name may be the name of a named storm such as a hurricane or winter storm. In embodiments, the forensic weather analyzer 102 contains or has access to a database that includes the time window for each named storm for a given region. In process step 1252, the event name is converted to an epoch time (e.g. number of GPS seconds). In other embodiments, a local time is received in process step 1254. Then, in process step 1256, the local time is converted to an epoch time such as GPS seconds, UTC time, Unix seconds, or other suitable epoch. In process step 1258, an event window is created. This may include adding a predetermined time offset before and after the epoch time. For example, in embodiments, the event window is defined as starting from three hours before the epoch time and ending at three hours after the epoch time.

Figure 13:
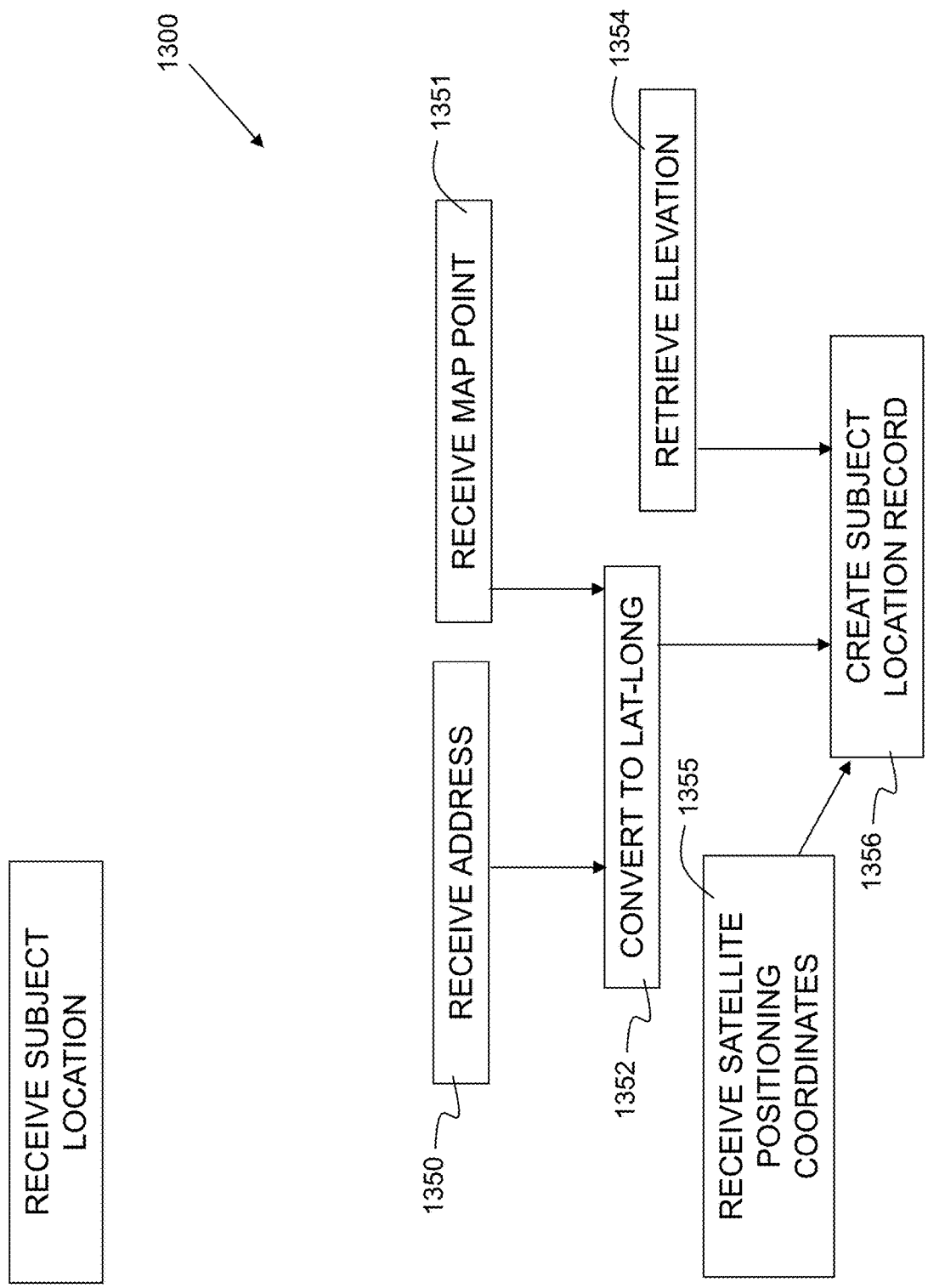
FIG. 13 is a flowchart indicating process steps for receiving a subject location.

FIG. 13 is a flowchart 1300 indicating process steps for receiving a subject location. This flowchart shows some additional sub-steps of step 1152 of flowchart 1100 of FIG. 11. In embodiments, an address is received at step 1350. The address may then be converted to a latitude-longitude coordinate pair in process step 1352. This may be performed by querying a database containing latitude-longitude pairs for each address. In process step 1356, the latitude longitude pair is stored as a subject location. Optionally, an elevation is retrieved in process step 1354 and also stored as part of the subject location information. Alternatively, instead of receiving a street address, a map point may be received in process step 1351. The map point may be selected by a user via a computer, tablet, or other suitable device. The map point may be converted to a latitude-longitude pair in process step 1352. Alternatively, the subject location may originate from receiving satellite positioning coordinates in process step 1355. For example, a smart phone with an integrated GPS may be used by an insurance adjuster. When the adjuster arrives at the property, a forensic weather report using the latitude and longitude recorded by the GPS may be initiated.

Figure 14:
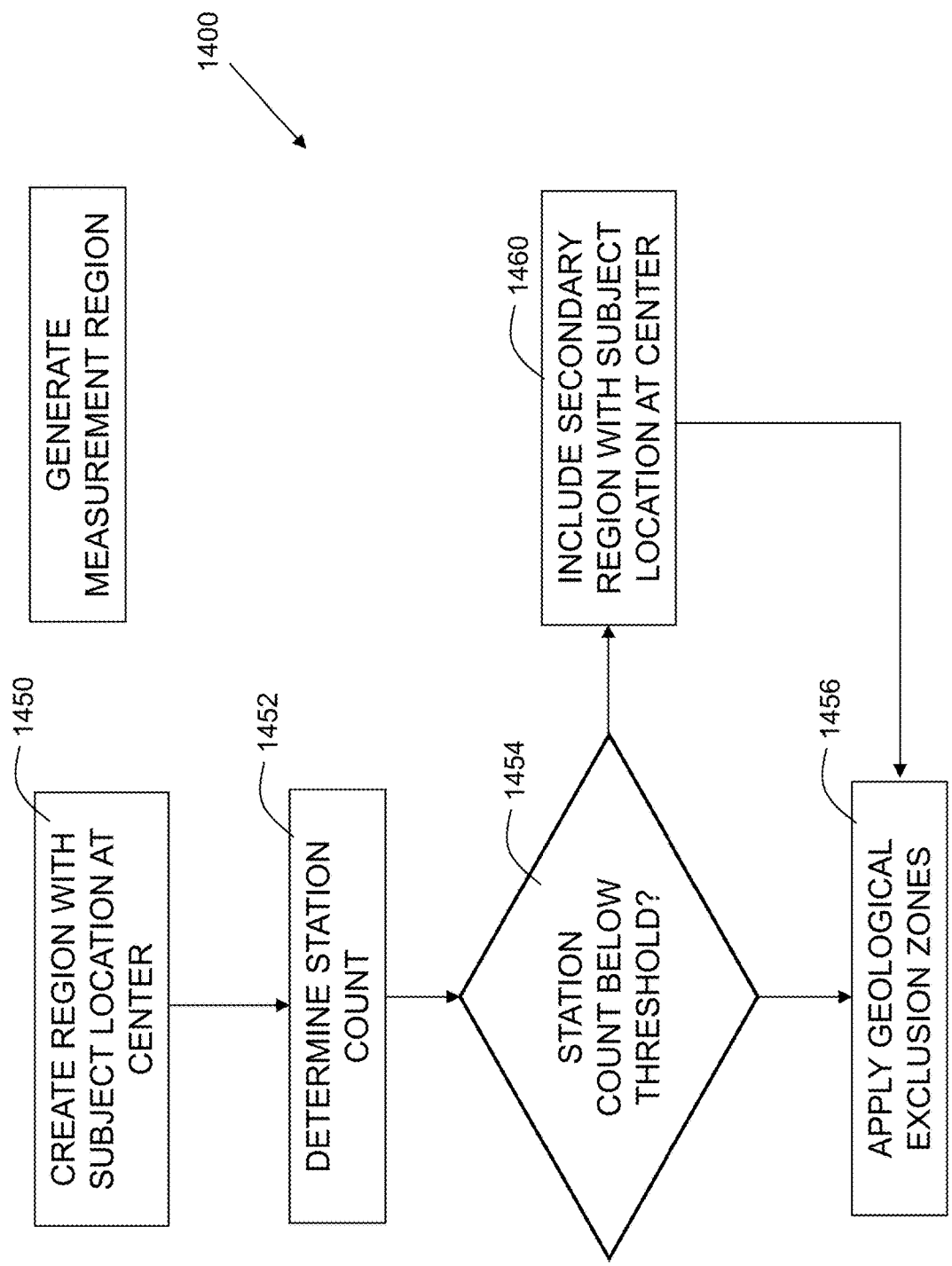
FIG. 14 is a flowchart indicating process steps for generating a measurement region.

FIG. 14 is a flowchart 1400 indicating process steps for generating a measurement region. This flowchart shows some additional sub-steps of step 1154 of flowchart 1100 of FIG. 11. In process step 1450, a region is created with a subject location at the center of it. In embodiments, the region may have a circular shape with a radius extending from the subject location to the perimeter of the measurement region. In process step 1452, a count of weather stations within the region is computed. This may be performed by computing a distance from the location of the weather station to the subject location. If the distance is less than the radius of the measurement region, then the weather station is deemed to be within the measurement region. For example, FIG. 4 shows three weather stations (408, 410, and 412) within the measurement region 406. Embodiments may then proceed to process step 1454, where a check is made to determine if a sufficient number of weather stations are present. In the example of FIG. 4, three weather stations are present. If the predetermined minimum number of stations is four, then as indicated in the map of FIG. 4, there are only three weather stations, and thus, the criterion is not met. If the criterion is not met, then the process may proceed to step 1460 which includes a secondary region with a subject location at its center. An example of a secondary region is shown as 514 in FIG. 5. In this example, the secondary region encompasses an additional weather station 516 to allow the number of weather stations to reach the predetermined threshold. If the number of weather stations is sufficient in process step 1454, then the process continues to process step 1456, of applying exclusion zones. An example of such an exclusion zone is shown as 828 in FIG. 8. In that example, the exclusion zone is removing a high-elevation area, to eliminate weather stations having an elevation above a predetermined threshold. Another example of a geological exclusion zone is shown as 620 of FIG. 6. In that example, a geological exclusion zone is formed over the portion of the measurement region that extends over the Atlantic Ocean. In this way, weather stations over the ocean may be eliminated from the analysis. In some scenarios, it may be desirable to include the over-ocean weather stations, whereas in other scenarios it may be desirable to exclude them. The geological exclusion zones allow an operator of the forensic weather analyzer to make such decisions on a case-by-case basis.

Figure 15:
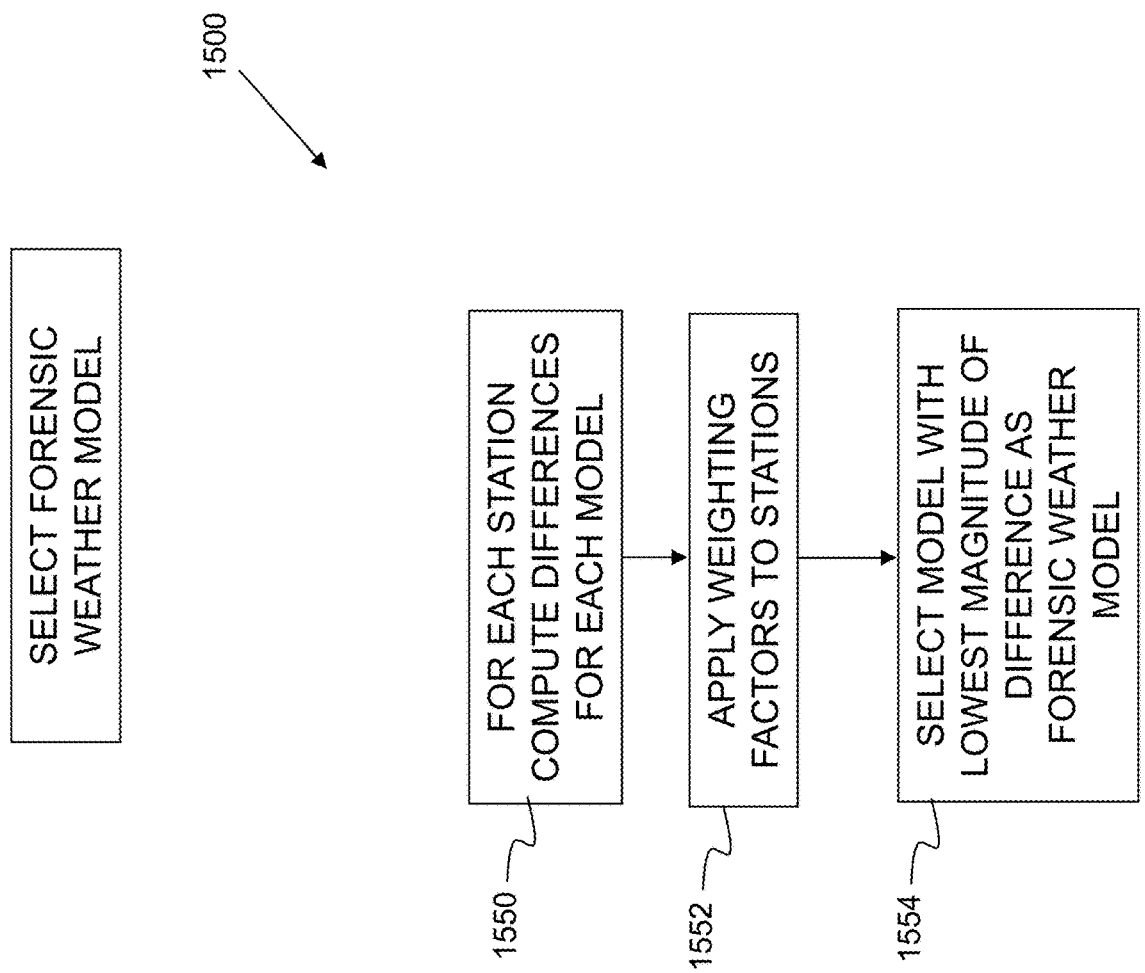
FIG. 15 is a flowchart indicating process steps for selecting a forensic weather model.

FIG. 15 is a flowchart 1500 indicating process steps for selecting a forensic weather model. This flowchart shows some additional sub-steps of step 1154 of flowchart 1100 of FIG. 11. At process step 1550, for each weather station, at a given date/time, actual meteorological measurements are compared with estimated measurements from each weather model for that location and date/time. Differences are computed between the actual measurement and the estimated measurements. The magnitude (absolute value of the differences) may be computed. In some embodiments, a plurality of weighting factors may be applied to the weather stations in process step 1552. In some embodiments, each difference is applied by a weighting factor K. In embodiments, K is a function of distance d between the weather station and subject location:

$$K=f(d)$$

In embodiments, the function may be defined as:

$$(R/d)$$

Where R=the distance of the radius of the measurement region and d is the distance from the weather station to the subject location.

Thus, supposing an example with two weather stations $W_1$ and $W_2$, where $W_1$ is 2 miles from the subject location, and $W_2$ is 4 miles from the subject location, and the measurement region radius is 8 miles, then for a given model, the total difference for the model $D_M$ may be defined as:

$$D_M=KT_1+KT_2$$

Where $T_X$ is the magnitude of difference between the actual meteorological measurement from weather station $W_X$ and the estimated value from weather model $M_X$. Substituting the example values yields:

$$D_M=4(T_1)+2(T_2)$$

Thus, as can be seen, the formula gives more weight to weather station comparisons that are closer to the subject location.

Using the difference values from table 1000 (FIG. 1), the total difference for the models shown is:

| Model # | W1 | W2 | Total Diff |
|---------|------|------|------------|
| Model 1 | 0.6  | 1.5  | 5.4        |
| Model 2 | 12.5 | 11   | 72         |
| Model 3 | 15.2 | 5.1  | 71         |

Note that the absolute values of the differences are shown in the above table.

In process step 1554, the model with the lowest magnitude of difference is selected as the forensic weather mode. Thus, using the aforementioned example, it can be seen that Model 1 has the lowest total difference, and so Model 1 is selected as the forensic weather model.

In some embodiments, the forensic weather analyzer may include instructions stored in memory that compare a sustained wind data point from one or more models at a weather station location with the actual measurement from the weather station. The comparison may be used in evaluation of which model is best for modeling a particular weather event. In some embodiments, the distance between the weather station and the subject location is considered in the evaluation. In some embodiments, only weather stations within a predetermined distance from the subject location may be considered. In other embodiments, a weighting factor may be used, such that the closer the weather station is to the subject location, the more weight is used in determining the effectiveness of the model. The model effectiveness may be determined by computing an error between each model and the actual measurement. The error may then be weighted as a function of distance from the subject location, or filtered out completely if the weather station is deemed to be too far from the subject location.

Figure 16:
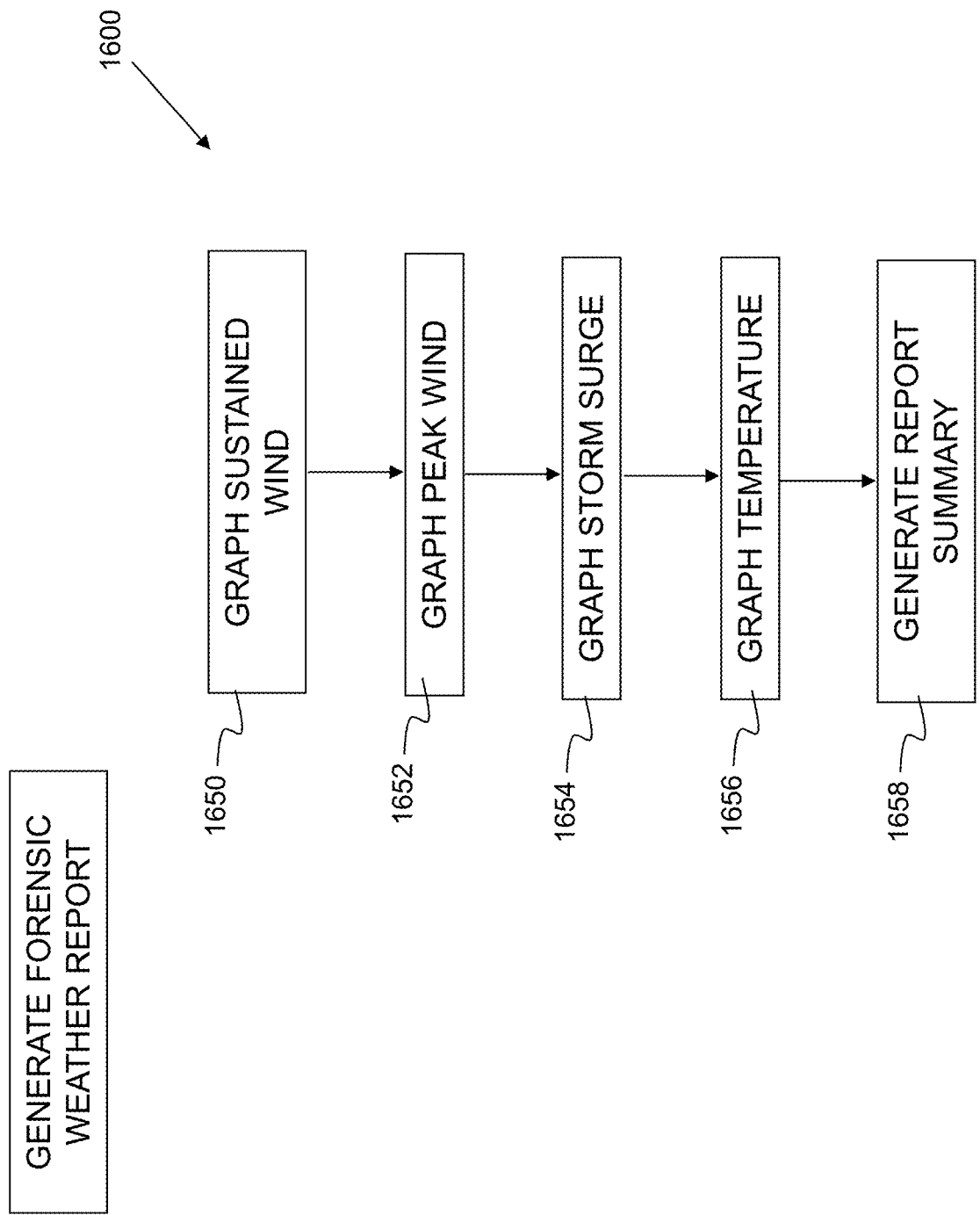
FIG. 16 is a flowchart indicating process steps for generating a forensic weather report.

FIG. 16 is a flowchart 1600 indicating process steps for generating a forensic weather report. This flowchart shows some additional sub-steps of step 1164 of flowchart 1100 of FIG. 11. In process step 1650, a graph of the sustained wind speed as a function of time during the event window is rendered. In process step 1652, a graph of the peak wind speed as a function of time during the event window is rendered. In process step 1654, a graph of the storm surge as a function of time during the event window is rendered. In process step 1656, a graph of the temperature as a function of time during the event window is rendered. In process step 1658, a report summary including textual data indicating modeled weather conditions during the event window is displayed.

Figure 17:
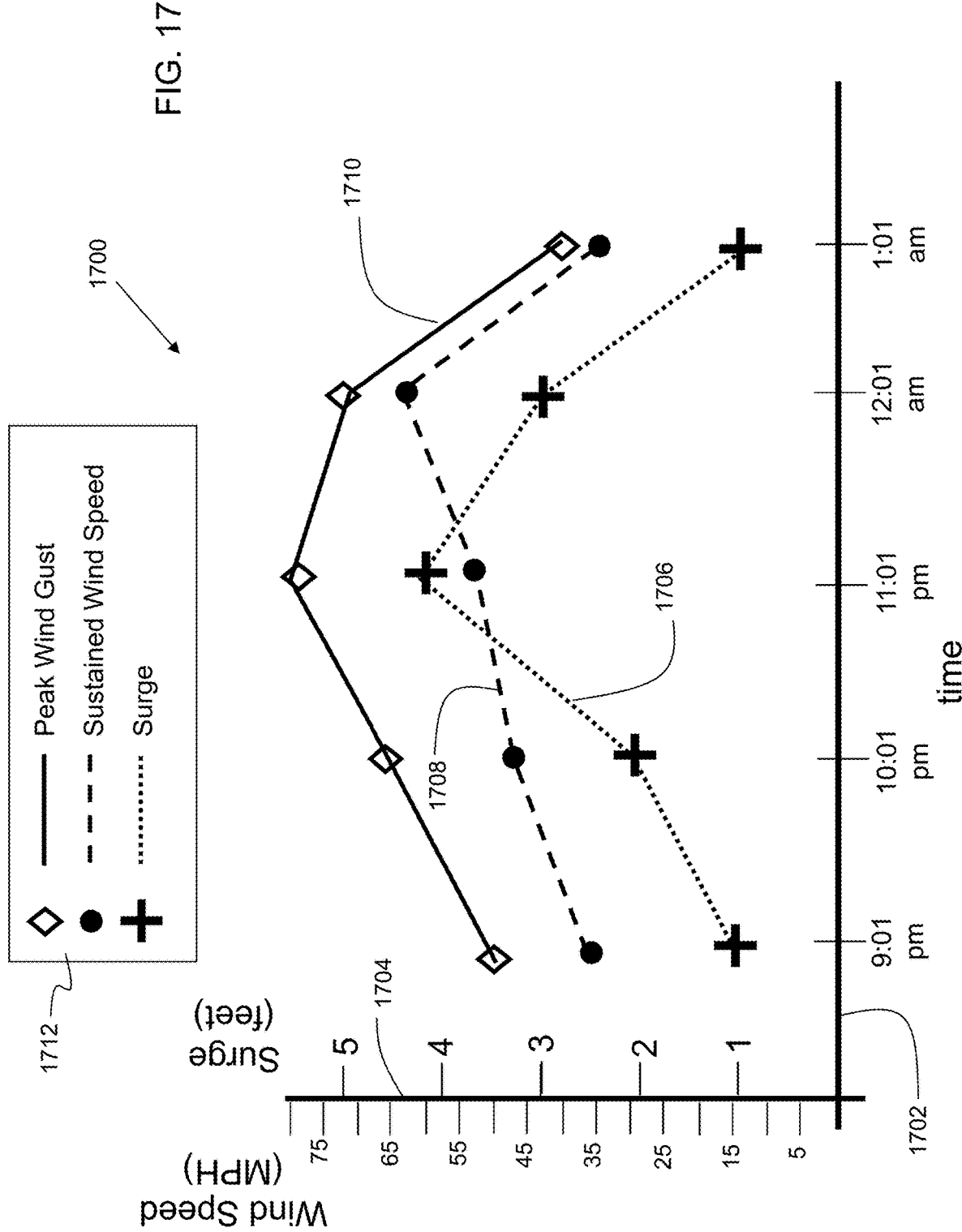
FIG. 17 is a plot from an exemplary forensic weather report.

FIG. 17 is a plot 1700 from an exemplary forensic weather report. The horizontal axis 1702 shows time intervals. The vertical axis 1704 is a dual value axis. The right side shows storm surge in feet. The left side of the vertical axis shows wind speed in miles per hour. This allows overlay of various modeled data points. Plot 1706 represents a storm surge as estimated from a SLOSH model or ADCIRC. Plot 1708 represents a sustained wind speed as estimated from the forensic weather model. Plot 1710 represents a peak wind gust speed as estimated from the forensic weather model. A legend 1712 provides symbol explanations for understanding of the plots.

FIG. 18 is a report summary 1800 from an exemplary forensic weather report. Field 1802 indicates a subject location for the forensic weather report. Field 1804 indicates a start time for the forensic weather report. Field 1806 indicates a maximum storm surge for the forensic weather report. Field 1808 indicates a maximum storm surge time for the forensic weather report. Field 1810 indicates a maximum sustained wind for the forensic weather report. Field 1812 indicates a maximum sustained wind time for the forensic weather report. Field 1814 indicates a peak wind gust speed for the forensic weather report. Field 1816 indicates a peak wind gust time for the forensic weather report.

Figure 19:
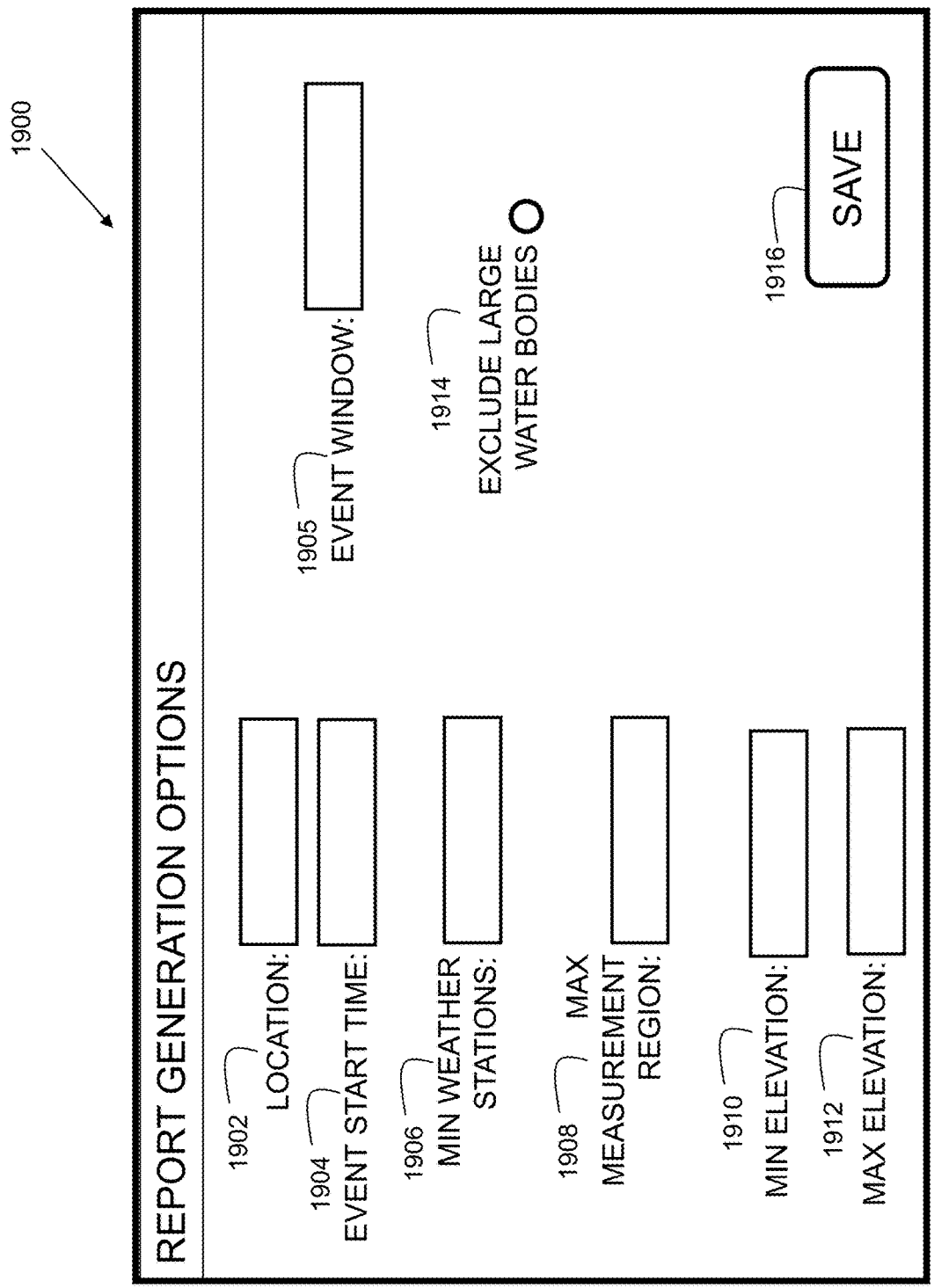
FIG. 19 is an exemplary user interface for forensic weather report generation options.

FIG. 19 is an exemplary user interface 1900 for forensic weather report generation options. Field 1902 accepts a subject location. Field 1904 accepts an event start time. Field 1905 accepts an event window. The event window is a duration of the event, typically entered in hours. Field 1906 allows a user to specify a minimum number of weather stations to attempt to be used in selection of a forensic weather model. Field 1908 allows a user to specify a maximum measurement region to be used in selection of a forensic weather model. In embodiments, the forensic weather analyzer limits the measurement region to the size specified in field 1908, even if the number of weather stations is below the value established in field 1906. Field 1910 allows specification of a minimum elevation (with respect to sea level) of a weather station. Field 1912 allows specification of a maximum elevation (with respect to sea level) of a weather station. Embodiments may exclude weather stations that have an elevation outside of the range specified by fields 1910 and 1912. Field 1914 is an option to allow exclusion of weather stations over large bodies of water such as oceans or Great Lakes. In embodiments, field 1914 may be implemented as a radio button. Field 1916 is a Save button, allowing the information to be saved into the memory 106 of the forensic weather analyzer 102, so that the data can be used in the generation of a forensic weather report such as that shown in FIG. 17. and FIG. 18. In embodiments, the user interface 1900 may be implemented via an HTML page and rendered on a client device (such as 126 of FIG. 1). In other embodiments, the user interface 1900 may be implemented directly by the forensic weather analyzer.

Figure 20:
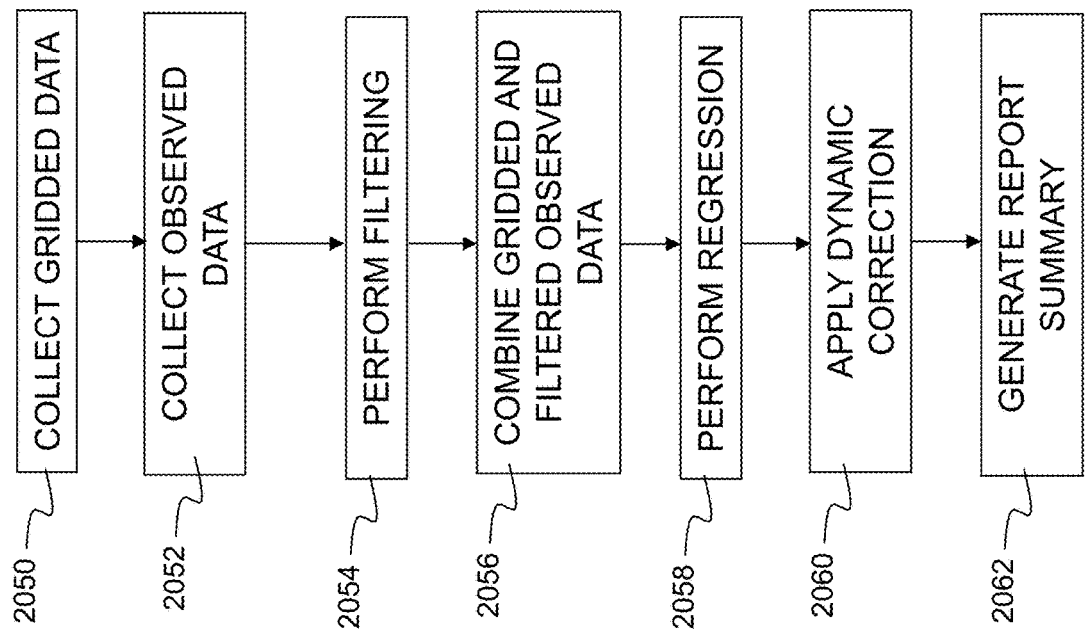
FIG. 20 is a flowchart for additional embodiments of the present invention.

FIG. 20 is a flowchart 2000 for additional embodiments of the present invention. In process step 2050, gridded data is collected. Gridded data includes data provided by weather agencies, for example, National Weather Service, an agency of the U.S. federal government. The gridded data can include, but is not limited to, High Resolution Rapid Refresh Data (HRRR), Rapid Refresh data (RR), Unrestricted Mesoscale Analysis data (URMA), and/or Multi-Radar/Multi-Sensor data (MRMS). In embodiments, obtaining gridded data pertaining to the subject location includes obtaining gridded data representing locations within 20 miles of the subject location. The 20-mile limit is exemplary, and other embodiments may use another threshold value instead of 20 miles.

The URMA information is based on a high-spatial and temporal resolution analysis/assimilation system for near-surface weather conditions. The MRMS information comes from a system that combines data streams from multiple radars, satellites, surface observations, upper air observations, lightning reports, rain gauges and numerical weather prediction models to produce a suite of decision-support products every two minutes. It provides better depictions of high-impact weather events such as heavy rain, snow, hail, tornadoes, and other threats, enabling more accurate and earlier forecasts and warnings.

In process step 2052, observed data is collected. In embodiments, obtaining observed data pertaining to the subject location includes obtaining observed data representing locations within 20 miles of the subject location. This can include, but is not limited to, downloading of all hourly and/or sub-hourly observed sustained and wind gust data from MADIS (Meteorological Assimilation Data Ingest System). All sub-hourly values are rolled up into hourly values only keeping the maximum for that hour. MADIS ingests data from NOAA data sources and non-NOAA providers, decodes the data then encodes all of the observational data into a common format with uniform observational units and time stamps. It should be recognized that a limit of 20 miles is exemplary, and any suitable distance may be substituted within embodiments of the invention.

In process step 2054, filtering is performed. This includes disregarding observed data for sites missing a predefined percentage of data. In some embodiments, the predefined percentage ranges from 10 percent to 30 percent of the gridded data value. In other embodiments, the predefined percentage ranges from 20 percent to 50 percent of the gridded data value. These ranges are examples, and any suitable ranges can be substituted within the scope of the invention. The filtering can further include comparing the observed data with gridded data for the same area over the same time period. If the difference between the observed data and the gridded data exceeds a predetermined threshold, the observed data may be discarded. In some embodiments, the predetermined threshold ranges from 10 percent to 30 percent of the gridded data value. As an example, if gridded data indicates a wind speed of 90 mph, and observed data indicates a wind speed of 11 mph, the observed data may be discarded as it deviates by more than 30 percent. This discards outlier readings due to faulty anemometers, nearby objects blocking the airflow to the anemometers, and/or other factors that can cause outlier data that can skew calculations. The predetermined threshold range is an example, and any suitable ranges can be substituted within the scope of the invention. In embodiments, the observed data value can include a maximum sustained wind speed, a maximum wind gust, a maximum temperature, a minimum temperature, an hourly precipitation estimate, a cumulative precipitation estimate, a sunlight estimate (based on cloud cover estimates), and/or other meteorological parameter estimates.

In process step 2056, the gridded data and the filtered observed data are combined. This can include combining data from, for example, URMA and HRRR data-sets, with the filtered observed data. In process step 2058, a regression model is then built. In embodiments, the regression model may be built using a computer-implemented application that utilizes the Scikit-Learn Machine Learning API or another suitable technique. The regression model provides a data-set that has been corrected to match the observed data. This data can provide better results than either the URMA or HRRR alone. In some embodiments, a separate model is built for gusts and sustained speeds.

In process step 2060, a dynamic correction is applied. In some embodiments, the dynamic correction may be applied according to the following algorithm:

The distance from a subject location for which forensic analysis is desired, to the nearest observed data location is calculated. If the distance is less than 10 miles, the regression model generated in process step 2058 is used and applied to the gridded data. A distance weighting function is applied to diminish the effects of the observed correction as it gets further from the subject location. In embodiments, the weighting function is:

$$W(d)$$

Where d is the distance from the observed data location to the subject location. In some embodiments, the function W may be a linear function such as:

$$W=(1-d/(d+K))$$

Where K is a constant and d is the distance. As an example, using a value of 3 for K, this weighting formula produces the following weights:

| distance (miles) | weight |
|---|---|
| 1 | 0.75 |
| 2 | 0.6 |
| 3 | 0.5 |
| 4 | 0.428571 |
| 5 | 0.375 |

Thus, as the observed data location is further from the subject location, it contributes less to the estimated result.

If there is no observed data within 10 miles of the requested subject location, only the gridded data from step 2050 is used. Thus, in embodiments, performing a dynamic correction comprises determining the distance between the subject location and an observed data location, and discarding the observed data location if the distance exceeds a predetermined observed data distance threshold. In some embodiments, the observed data distance threshold is 10 miles. This threshold is exemplary, and another can be substituted within the scope of the invention. In addition, the algorithm is an example, and in implementations, another suitable algorithm may be substituted within the scope of the invention.

In process step 2062, a summary report is generated. The summary report can include various estimated information for the subject location. The information can include maximum sustained wind speeds, maximum wind gusts, maximum hourly precipitation, and/or cumulative precipitation. Other parameters may also be shown in the summary report.

Figure 21A:
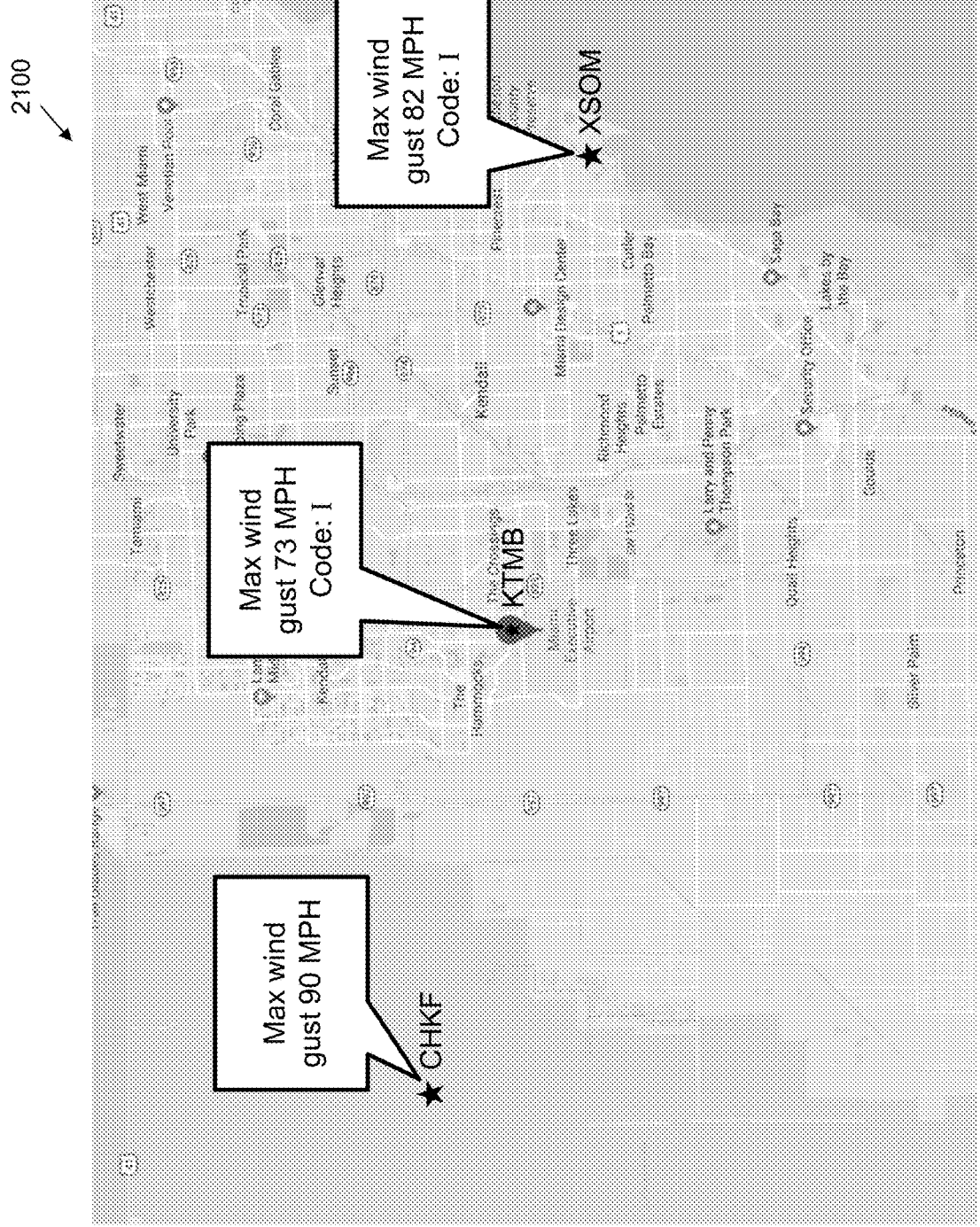
FIG. 21A shows a map of an exemplary area with weather stations.

FIG. 21A shows a map 2100 of an exemplary area with weather stations. The example uses the Miami Executive Airport (KTMB), located at 12800 SW 145th Avenue in Miami, Fla. The weather station CHKF1 reported a maximum wind gust of 90 Miles Per Hour (MPH). Weather station XSOM reported a maximum wind gust of 82 MPH, with the "Code: I" indicating that the data is incomplete due to malfunction, power loss or evacuation. It is not unusual that during severe weather events, many weather stations contain either missing or incomplete weather information. In this example the Miami Executive Airport (KTMB) reported an "incomplete" maximum wind gust of 73 MPH. To reduce the inaccuracies caused by the incomplete data, disclosed embodiments incorporate additional MADIS data as well as perform linear regression modeling.

Figure 21B:
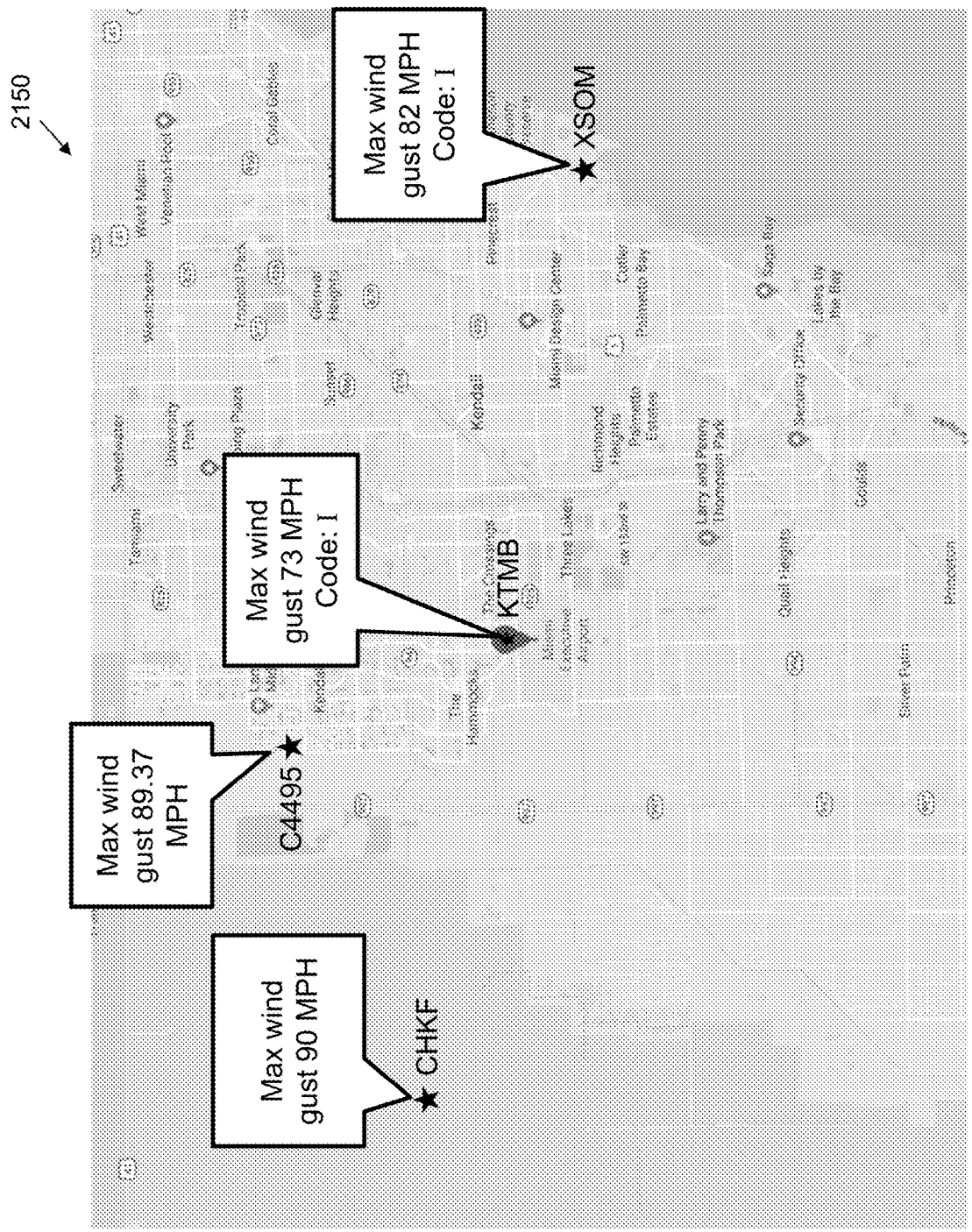
FIG. 21B shows the area of FIG. 21A incorporating additional station for a linear regression weighting adjustment.

FIG. 21B shows the area of FIG. 21A incorporating additional station for a linear regression weighting adjustment. A query is made to MADIS for additional nearby weather stations. In the example, MADIS data identified station "C4495", located 1.29 miles away from the subject location (KTMB), for inclusion in a linear regression weighting adjustment. The results yielded maximum wind gusts of 89.37 MPH, which is consistent with the weather station wind gust reports of 90 MPH to the west-southwest of the airport and the 83 MPH wind gust report to the southeast of the airport.

Figure 22:
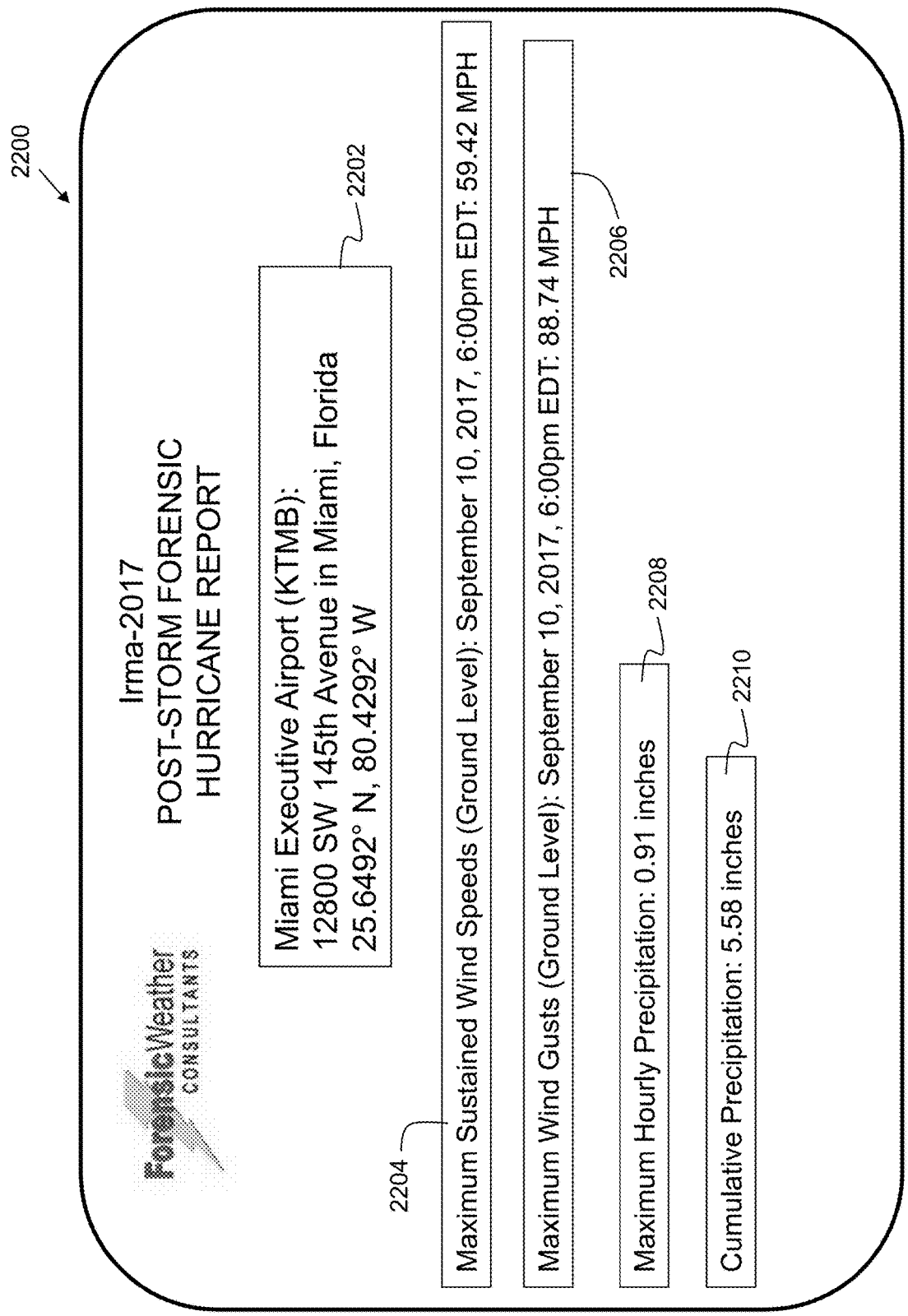
FIG. 22 shows an exemplary output of embodiments of the present invention.

FIG. 22 shows an exemplary output of embodiments of the present invention. Report 2200 includes a location 2202. The location 2202 can include a name, street address, latitude and longitude coordinates, and/or other suitable information. Forensic information is displayed in various fields. The fields can include maximum sustained wind speed field 2204, maximum wind gust field 2206, maximum hourly precipitation field 2208, and maximum cumulative precipitation field 2010. Other fields may be displayed instead of, or in addition to, the fields shown. As can be seen in field 2206, the maximum wind gust value for the subject location of Miami Executive Airport (KTMB) is estimated at 88.74 MPH. This value is based in part on the reporting of station C4495 shown in FIG. 21B. The value is then weighted based on distance from the subject location (1.29 miles in this example). The resulting estimate of 88.74 is likely more accurate than the KTMB data of 73 MPH which is indicated as incomplete.

Thus, disclosed embodiments improve the technical field of forensic weather analysis, enabling a more accurate assessment of conditions at a subject location based on measurements in surrounding areas. Sources of gridded data and observed data from various weather instruments are combined to create a more accurate assessment of past weather conditions at a given location. This can provide useful information for studying storm damage. The results can be applied in engineering, architectural, insurance, and agricultural fields, enabling improved resilience for future weather events.

Although embodiments of the invention have been described herein as systems and method, in some embodiments, the invention may include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A computer-implemented method for estimating weather conditions at a subject location at a previous time, comprising:
    detecting an incomplete data condition at the subject location;
    in response to detecting the incomplete data condition, obtaining gridded data pertaining to the subject location;
    obtaining observed data pertaining to the subject location;
    performing filtering on the observed data to create filtered observed data;
    combining the gridded data with the filtered observed data to create a combined dataset;
    performing a linear regression on the combined dataset;
    applying a dynamic correction based on distance between subject location and observed data locations;
    computing an estimated weather condition for the subject location based on the dynamic correction; and
    generating a report, wherein the report includes the estimated weather condition for a previous time, at the subject location.

2. The method of claim 1, wherein performing filtering includes discarding observed data in response to detecting that the observed data differs from a gridded data value by more than a predetermined threshold value.

3. The method of claim 2, wherein the predetermined threshold value ranges from 10 percent of the gridded data value to 30 percent of the gridded data value.

4. The method of claim 2, wherein the predetermined threshold value ranges from 20 percent of the gridded data value to 50 percent of the gridded data value.

5. The method of claim 1, wherein the estimated weather condition includes a maximum sustained wind speed at the subject location for a previous time.

6. The method of claim 1, wherein the estimated weather condition includes a maximum wind gust speed at the subject location for a previous time.

7. The method of claim 1, wherein the estimated weather condition includes an hourly precipitation estimate at the subject location for a previous time.

8. The method of claim 1, further comprising applying a linear weighting function to the observed data, wherein the linear weighting function is computed by computing the ratio of one minus the distance between the subject location and an observed data location selected from the observed data locations to the distance plus a constant.

9. The method of claim 1, wherein performing a dynamic correction comprises: determining the distance between the subject location and an observed data location; and discarding the observed data location if the distance exceeds a predetermined observed data distance threshold.

10. The method of claim 9, wherein the observed data distance threshold is 10 miles.

11. An electronic device comprising:
a processor;
a memory coupled to the processor;
the memory containing instructions, that when executed by the processor, perform the steps of:
detecting an incomplete data condition at the subject location;
in response to detecting the incomplete data condition, obtaining gridded data pertaining to the subject location;
obtaining observed data pertaining to the subject location;
performing filtering on the observed data to create filtered observed data;
combining the gridded data with the filtered observed data to create a combined dataset;
performing a linear regression on the combined dataset;
applying a dynamic correction based on distance between subject location and observed data locations;
computing an estimated weather condition for the subject location based on the dynamic correction; and
generating a report, wherein the report includes the estimated weather condition for a previous time, at the subject location.

12. The device of claim 11, wherein the memory further contains instructions, that when executed by the processor, perform the steps of discarding observed data in response to detecting that the observed data differs from a gridded data value by more than a predetermined threshold value.

13. The device of claim 12, wherein the memory further contains instructions, that when executed by the processor, perform the steps of establishing a predetermined threshold value that ranges from 10 percent of the gridded data value to 30 percent of the gridded data value.

14. The device of claim 12, wherein the memory further contains instructions, that when executed by the processor, perform the steps of establishing a predetermined threshold value that ranges from 20 percent of the gridded data value to 50 percent of the gridded data value.

15. The device of claim 12, wherein the memory further contains instructions, that when executed by the processor, perform the steps of computing an estimated weather condition of maximum sustained wind speed at the subject location for a previous time.

16. The device of claim 12, wherein the memory further contains instructions, that when executed by the processor, perform the steps of computing an estimated weather condition of maximum wind gust speed at the subject location for a previous time.

17. The device of claim 12, wherein the memory further contains instructions, that when executed by the processor, perform the steps of computing an estimated weather condition of maximum temperature at the subject location for a previous time.

18. The device of claim 12, wherein the memory further contains instructions, that when executed by the processor, perform the steps of computing an estimated weather condition of minimum temperature at the subject location for a previous time.

19. The device of claim 11, wherein the memory further contains instructions, that when executed by the processor, perform the steps of: determining the distance between the subject location and an observed data location; and discarding the observed data location if the distance exceeds a predetermined observed data distance threshold.

20. The device of claim 19, wherein the memory further contains instructions, that when executed by the processor, perform the step of establishing the predetermined observed data distance threshold at 10 miles.

* * * * *

UNITED STATES PATENT AND TRADEMARK OFFICE
CERTIFICATE OF CORRECTION

PATENT NO. : 10,725,205 B2  
APPLICATION NO. : 16/120941  
DATED : July 28, 2020  
INVENTOR(S) : Howard Gregory Altschule Page 1 of 1

It is certified that error appears in the above-identified patent and that said Letters Patent is hereby corrected as shown below:

On the Title Page

Item [60] Delete "provisional application No. 62/238,606, filed on Oct 7, 2015" and insert -- provisional application No. 62/238,206, filed on Oct 7, 2015 --

Signed and Sealed this  
Fifteenth Day of November, 2022

Katherine Kelly Vidal  
*Director of the United States Patent and Trademark Office*